United States Patent
Takano

(10) Patent No.: US 11,153,767 B2
(45) Date of Patent: Oct. 19, 2021

(54) APPARATUS AND METHOD FOR TRANSMITTING MEASUREMENT RESTRICTION AND CONFIGURATION INFORMATION

(71) Applicant: SONY CORPORATION, Tokyo (JP)

(72) Inventor: Hiroaki Takano, Saitama (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/532,277

(22) PCT Filed: Nov. 17, 2015

(86) PCT No.: PCT/JP2015/082323
§ 371 (c)(1),
(2) Date: Jun. 1, 2017

(87) PCT Pub. No.: WO2016/121201
PCT Pub. Date: Aug. 4, 2016

(65) Prior Publication Data
US 2017/0366981 A1    Dec. 21, 2017

(30) Foreign Application Priority Data

Jan. 29, 2015 (JP) ............................. JP2015-015976

(51) Int. Cl.
*H04B 7/0408* (2017.01)
*H04B 7/0417* (2017.01)
(Continued)

(52) U.S. Cl.
CPC .......... *H04W 16/28* (2013.01); *H04B 7/0408* (2013.01); *H04B 7/0417* (2013.01);
(Continued)

(58) Field of Classification Search
CPC .. H04B 7/0408; H04B 7/0417; H04B 7/0469; H04B 7/0478; H04B 7/0617;
(Continued)

(56) References Cited

U.S. PATENT DOCUMENTS 5,473,333 A * 12/1995 Chiba .................. H01Q 3/2605
342/157
6,301,238 B1 * 10/2001 Hagerman ............... H01Q 3/26
370/336
(Continued)

FOREIGN PATENT DOCUMENTS

JP    2012-204909 A    10/2012
JP    2014-53811 A    3/2014
(Continued)

OTHER PUBLICATIONS

International Search Report dated Jan. 12, 2016 in PCT/JP2015/082323 filed Nov. 17, 2015.
(Continued)

Primary Examiner — Melvin C Marcelo
Assistant Examiner — Natali Pascual Peguero
(74) Attorney, Agent, or Firm — Xsensus, LLP

(57) ABSTRACT

[Object] To enable more appropriate recognition of an interference situation of a directional beam.
[Solution] Provided is an apparatus including: an acquisition unit that acquires a weight set for forming a directional beam; and a control unit that multiplies a reference signal for channel quality measurement by the weight set. The weight set is a weight set that is able to be generated from a first weight set for acquiring directivity in a first direction, a second weight set for acquiring directivity in a second direction, and a third weight set for phase adjustment of dual layer multiple-input multiple-output (MIMO). The third
(Continued)

weight set is a specific one of a plurality of weight sets for phase adjustment of dual layer MIMO.

15 Claims, 17 Drawing Sheets

(51) Int. Cl.
*H04W 16/28* (2009.01)
*H04L 5/00* (2006.01)
*H04W 72/08* (2009.01)
*H04B 7/06* (2006.01)
*H04B 7/0456* (2017.01)

(52) U.S. Cl.
CPC ......... *H04B 7/0469* (2013.01); *H04B 7/0478* (2013.01); *H04B 7/0617* (2013.01); *H04B 7/0632* (2013.01); *H04L 5/0048* (2013.01); *H04W 72/082* (2013.01)

(58) Field of Classification Search
CPC .. H04B 7/0632; H04W 16/28; H04W 72/082; H04L 5/0048
USPC .................................................. 370/252, 329
See application file for complete search history.

(56) References Cited

U.S. PATENT DOCUMENTS

| | | | | |
|---|---|---|---|---|
| 2009/0298502 | A1* | 12/2009 | Hagerman | ............ H04W 36/30 455/436 |
| 2013/0258965 | A1* | 10/2013 | Geirhofer | ........... H04W 72/048 370/329 |
| 2014/0016497 | A1 | 1/2014 | Seo et al. | |
| 2014/0016556 | A1 | 1/2014 | Shimezawa et al. | |
| 2014/0098689 | A1* | 4/2014 | Lee | ....................... H04B 7/0469 370/252 |
| 2015/0023194 | A1* | 1/2015 | Seo | ........................ H04W 24/10 370/252 |
| 2015/0222340 | A1 | 8/2015 | Nagata et al. | |
| 2016/0065388 | A1 | 3/2016 | Kakishima et al. | |
| 2016/0112177 | A1* | 4/2016 | Zheng | ................... H04L 5/0051 370/330 |
| 2017/0105223 | A1* | 4/2017 | Zhang | ................... H04W 16/28 |

FOREIGN PATENT DOCUMENTS

| | | |
|---|---|---|
| JP | 2014-64294 A | 4/2014 |
| JP | 2014-523200 A | 9/2014 |
| JP | 2014-204305 A | 10/2014 |
| JP | 2015-503266 A | 1/2015 |
| JP | 2017-526207 A | 9/2017 |
| JP | 2017-537486 A | 12/2017 |
| WO | 2013/094980 A1 | 6/2013 |
| WO | 2014/052806 A1 | 4/2014 |

OTHER PUBLICATIONS

Supplemental European Search Report dated Aug. 2, 2018, in European Patent Application 15880093.8.

Japanese Office Action dated Sep. 24, 2019, issued in corresponding Japanese Patent Application No. 2019-071089.

* cited by examiner

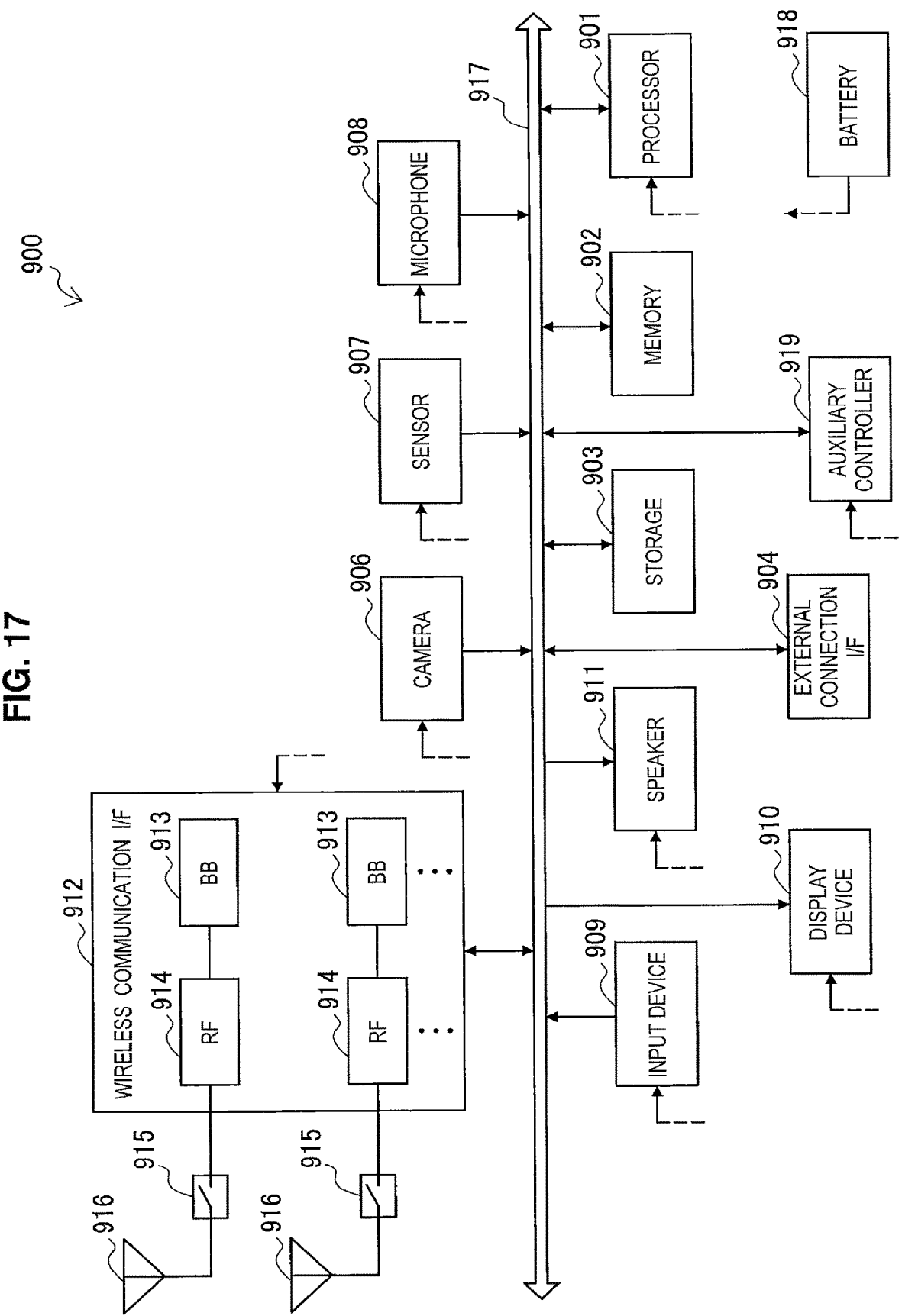

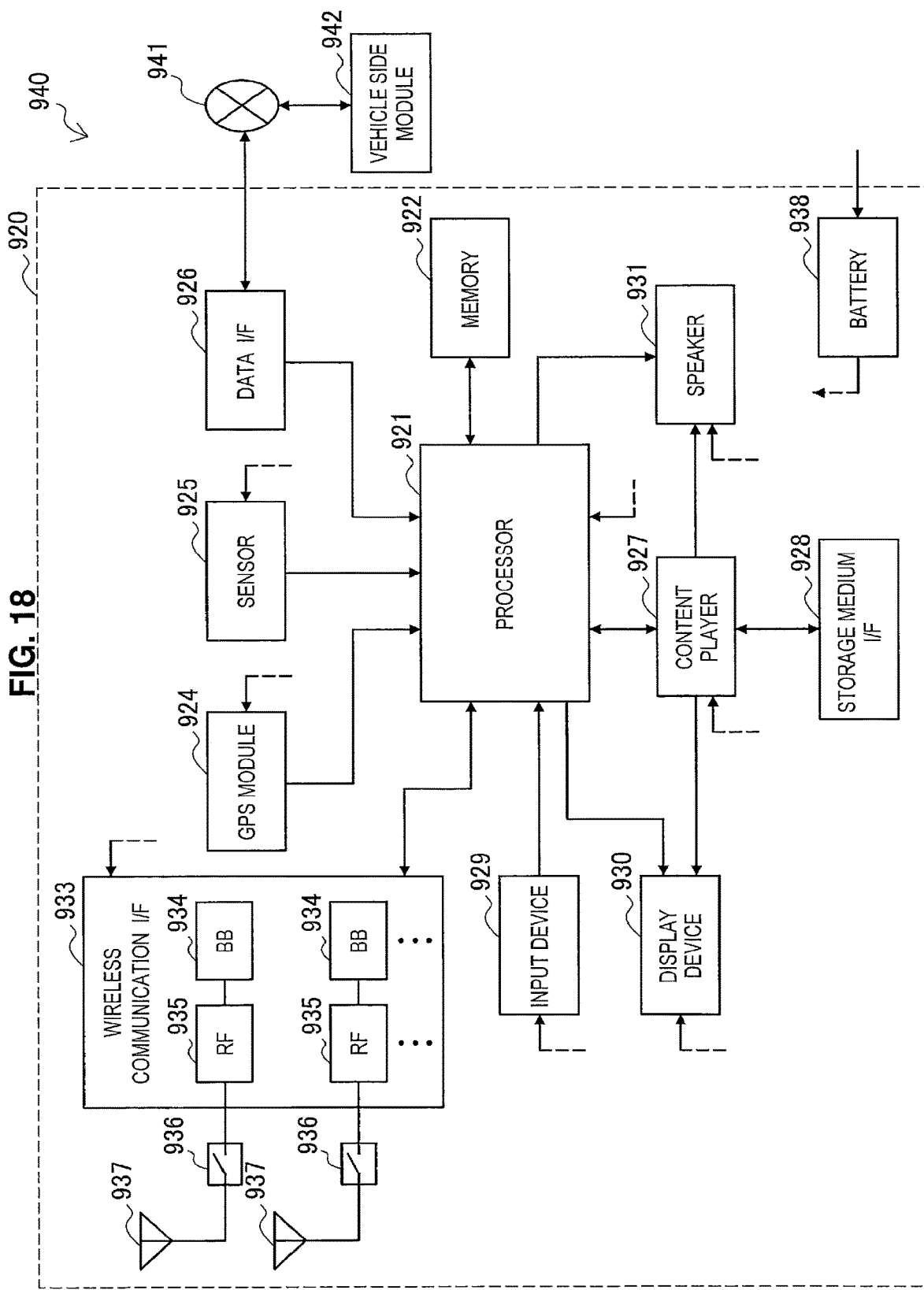

APPARATUS AND METHOD FOR TRANSMITTING MEASUREMENT RESTRICTION AND CONFIGURATION INFORMATION

TECHNICAL FIELD

The present disclosure relates to apparatuses and methods.

BACKGROUND ART

In the Third Generation Partnership Project (3GPP), various techniques for improving the capacity of a cellular system are currently studied in order to accommodate explosively increasing traffic. It is also envisaged that the required capacity will become about 1000 times the current capacity in the future. Techniques such as multi-user multi-input multiple-input multiple-output (MU-MIMO), coordinated multipoint (CoMP), and the like could increase the capacity of a cellular system by a factor of as low as less than ten. Therefore, there is a demand for an innovative technique.

For example, as a technique for significantly increasing the capacity of a cellular system, a base station may perform beamforming using a directional antenna including a large number of antenna elements (e.g., about 100 antenna elements). Such a technique is a kind of technique called large-scale MIMO or massive MIMO. By such beamforming, the half-width of a beam is narrowed. In other words, a sharp beam is formed. Also, if the large number of antenna elements are arranged in a plane, a beam aimed in a desired three-dimensional direction can be formed.

For example, Patent Literatures 1 to 3 disclose techniques applied when a directional beam aimed in a three-dimensional direction is used.

CITATION LIST

Patent Literature

Patent Literature 1: JP 2014-204305A
Patent Literature 2: JP 2014-53811A
Patent Literature 3: JP 2014-64294A

DISCLOSURE OF INVENTION

Technical Problem

For example, a channel state information reference signal (CSI-RS) is transmitted without beamforming. In this case, signal intensity of the CSI-RS is low, and it may be difficult to perform measurement of the CSI-RS (e.g., calculation of an amount of interference of a directional beam). Accordingly, transmitting a CSI-RS, for example, over a directional beam is considered. For example, in a case in which large-scale MIMO is applied, a CSI-RS may be transmitted over a directional beam of large-scale MIMO.

For example, a weight set for forming a directional beam of large-scale MIMO may be divided into a first weight set for acquiring directivity in the horizontal direction, a second weight set for acquiring directivity in the vertical direction, and a third weight set for phase adjustment of dual layer MIMO.

However, a value calculated as the amount of interference of the directional beam may be changed depending on whether the third weight set is one of a plurality of weight sets. Accordingly, a smaller amount of interference than the amount of interference which can actually be generated may be calculated, for example. Consequently, a directional beam that deteriorates received quality is not recognized, and thus interference may be continuously generated.

Therefore, it is desirable to provide a system which enables more appropriate recognition of an interference situation of a directional beam.

Solution to Problem

According to the present disclosure, there is provided an apparatus including: an acquisition unit that acquires a weight set for forming a directional beam; and a control unit that multiplies a reference signal for channel quality measurement by the weight set. The weight set is a weight set that is able to be generated from a first weight set for acquiring directivity in a first direction, a second weight set for acquiring directivity in a second direction, and a third weight set for phase adjustment of dual layer multiple-input multiple-output (MIMO). The third weight set is a specific one of a plurality of weight sets for phase adjustment of dual layer MIMO.

In addition, according to the present disclosure, there is provided a method including, by a processor: acquiring a weight set for forming a directional beam; and multiplying a reference signal for channel quality measurement by the weight set. The weight set is a weight set that is able to be generated from a first weight set for acquiring directivity in a first direction, a second weight set for acquiring directivity in a second direction, and a third weight set for phase adjustment of dual layer MIMO. The third weight set is a specific one of a plurality of weight sets for phase adjustment of dual layer MIMO.

In addition, according to the present disclosure, there is provided an apparatus including: an acquisition unit that acquires information indicating a configuration of a reference signal for channel quality measurement to be multiplied by a weight set for forming a directional beam; and a control unit that calculates an amount of interference of the directional beam from the reference signal multiplied by the weight set. The weight set is a weight set that is able to be generated from a first weight set for acquiring directivity in a first direction, a second weight set for acquiring directivity in a second direction, and a third weight set for phase adjustment of dual layer MIMO. The third weight set is a specific one of a plurality of weight sets for phase adjustment of dual layer MIMO.

In addition, according to the present disclosure, there is provided an apparatus including: an acquisition unit that acquires measurement restriction information indicating restriction on measurement of a reference signal for channel quality measurement transmitted over a directional beam; and a control unit that notifies a terminal apparatus of the measurement restriction information.

In addition, according to the present disclosure, there is provided a method including, by a processor: acquiring measurement restriction information indicating restriction on measurement of a reference signal for channel quality measurement transmitted over a directional beam; and notifying a terminal apparatus of the measurement restriction information.

In addition, according to the present disclosure, there is provided an apparatus including: an acquiring unit that acquires measurement restriction information indicating restriction on measurement of a reference signal for channel quality measurement transmitted over a directional beam; and a control unit that performs measurement of a reference signal for channel quality measurement transmitted over a directional beam on the basis of the measurement restriction information.

Advantageous Effects of Invention

According to the present disclosure as described above, it is possible to more appropriately recognize an interface situation of a directional beam. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 17 is a block diagram illustrating an example of a schematic configuration of a smartphone.

FIG. 18 is a block diagram illustrating an example of a schematic configuration of a car navigation apparatus.

MODE(S) FOR CARRYING OUT THE INVENTION

Figure 1:
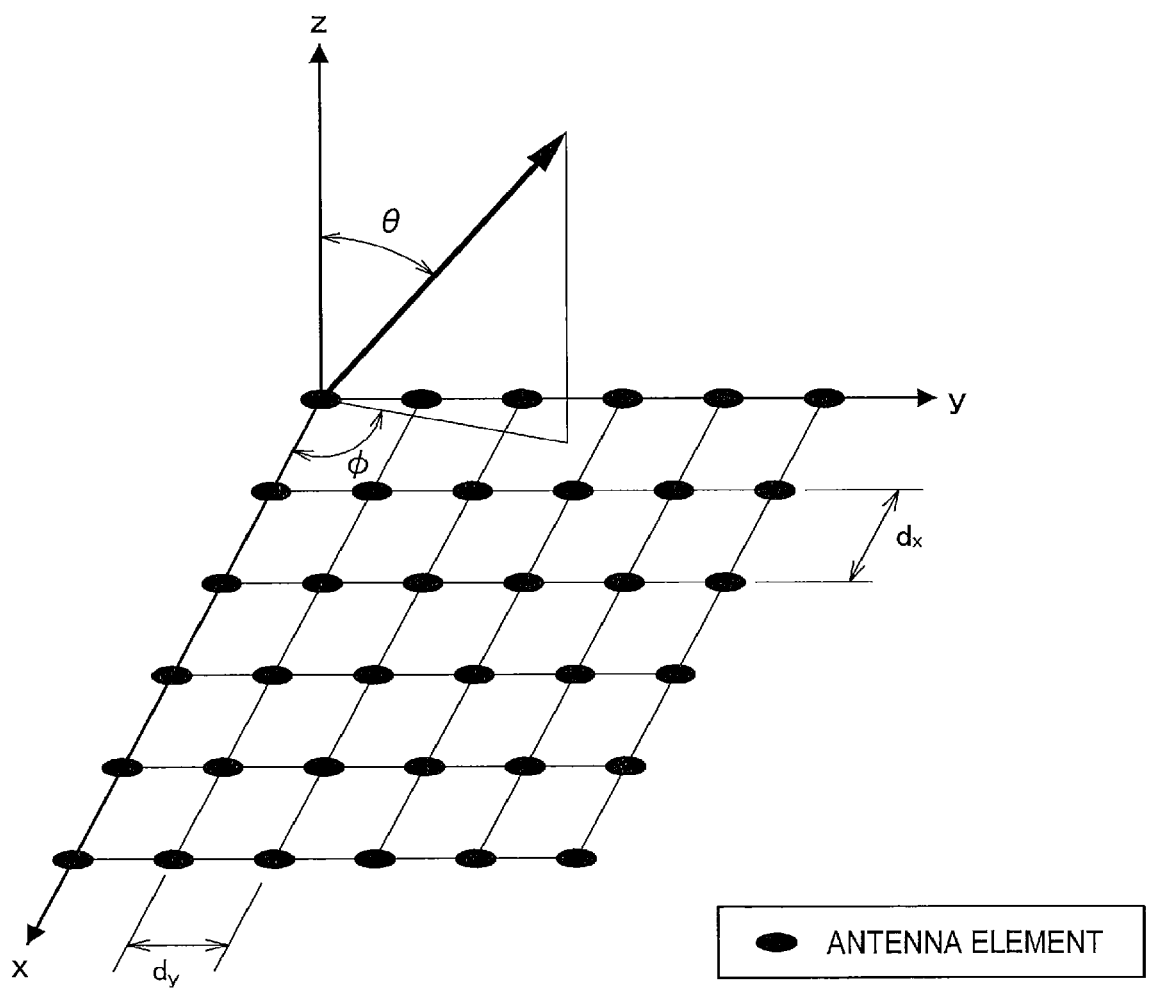
FIG. 1 is a diagram for describing a weight set for large-scale MIMO beamforming.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Description will be given in the following order.
1. Introduction
1.1. Related techniques
1.2. Consideration related to present embodiment
2. Schematic configuration of system
3. Configuration of each apparatus
3.1. Configuration of base station
3.2. Configuration of terminal apparatus
4. First Embodiment
4.1. Technical problems
4.2. Technical features
4.3. Processing flow
5. Second Embodiment
5.1. Technical problems
5.2. Technical features
5.3. Processing flow
5.4. Modification example
6. Application examples
6.1. Application examples related to base station
6.2. Application examples related to terminal apparatus
7. Conclusion 1. Introduction First of all, techniques related to an embodiment of the present disclosure and consideration related to the present embodiment will be described with reference to FIGS. 1 to 7.

<1.1. Related Techniques>

Beamforming and measurement will be described as techniques related to an embodiment of the present disclosure with reference to FIGS. 1 to 4.

(1) Beamforming (a) Necessity of Large-Scale MIMO

In the 3GPP, various techniques for improving the capacity of a cellular system are currently studied in order to accommodate explosively increasing traffic. It is envisaged that the required capacity will become about 1000 times the current capacity in the future. Techniques such as MU-MIMO, CoMP, and the like could increase the capacity of a cellular system by a factor of as low as less than ten. Therefore, there is a demand for an innovative technique.

Release 10 of the 3GPP specifies that eNode B is equipped with eight antennas. Therefore, the antennas can provide eight-layer MIMO in the case of single-user multi-input multiple-input multiple-output (SU-MIMO). Eight-layer MIMO is a technique of spatially multiplexing eight separate streams. Alternatively, the antennas can provide four-user two-layer MU-MIMO.

User equipment (UE) has only a small space for accommodating an antenna, and limited processing capability, and therefore, it is difficult to increase the number of antenna elements in the antenna of UE. However, recent advances in antenna mounting technology have allowed eNnode B to accommodate a directional antenna including about 100 antenna elements.

For example, as a technique for significantly increasing the capacity of a cellular system, a base station may perform beamforming using a directional antenna including a large number of antenna elements (e.g., about 100 antenna elements). Such a technique is a kind of technique called large-scale MIMO or massive MIMO. By such beamforming, the half-width of a beam is narrowed. In other words, a sharp beam is formed. Also, if the large number of antenna elements are arranged in a plane, a beam aimed in a desired three-dimensional direction can be formed. For example, it has been proposed that, by forming a beam aimed at a higher position than that of a base station (e.g., a higher floor of a high-rise building), a signal is transmitted to a terminal apparatus located at that position.

In typical beamforming, the direction of a beam can be changed in the horizontal direction. Therefore, it can be said that the typical beamforming is two-dimensional beamforming. Meanwhile, in large-scale MIMO (or massive MIMO) beamforming, the direction of a beam can be changed in the vertical direction as well as the horizontal direction. Therefore, it can be said that large-scale MIMO beamforming is three-dimensional beamforming.

Note that the increase in the number of antennas allows for an increase in the number of MU-MIMO users. Such a technique is another form of the technique called large-scale MIMO or massive MIMO. Note that when the number of antennas in UE is two, the number of spatially separated streams is two for a single piece of UE, and therefore, it is more reasonable to increase the number of MU-MIMO users than to increase the number of streams for a single piece of UE.

(b) Weight Set

A set of weight for beamforming are represented by a complex number (i.e., a set of weight coefficients for a plurality of antenna elements). An example of a weight set particularly for large-scale MIMO beamforming will now be described with reference to FIG. 1.

FIG. 1 is a diagram for describing a weight set for large-scale MIMO beamforming. FIG. 1 shows antenna elements arranged in a grid pattern. FIG. 1 also shows two orthogonal axes x and y in a plane in which the antenna elements are arranged, and an axis z perpendicular to the plane. Here, the direction of a beam to be formed is, for example, represented by an angle phi (Greek letter) and an angle theta (Greek letter). The angle phi (Greek letter) is an angle between an xy-plane component of the direction of a beam and the x-axis. Also, the angle theta (Greek letter) is an angle between the beam direction and the z-axis. In this case, for example, the weight coefficient $V_{m,n}$ of an antenna element which is m-th in the x-axis direction and n-th in the y-axis direction is represented as follows.

$$V_{m,n}(\theta, \varphi, f) = \exp\left(j2\pi\frac{f}{c}\{(m-1)d_x\sin(\theta)\cos(\varphi) + (n-1)d_y\sin(\theta)\sin(\varphi)\}\right)$$ [Math. 1]

In formula (1), f is a frequency, and c is the speed of light. Also, j is the imaginary unit of a complex number. Also, $d_x$ is an interval between each antenna element in the x-axis direction, and $d_y$ is an interval between each antenna element in the y-axis direction. Note that the coordinates of an antenna element are represented as follows.

$$x=(m-1)d_x, y=(n-1)d_y$$ [Math. 2]

A weight set for typical beamforming (two-dimensional beamforming) may be divided into a weight set for acquiring directivity in the horizontal direction and a weight set for phase adjustment of dual layer MIMO (i.e., a weight set for phase adjustment between two antenna subarrays corresponding to different polarized waves). On the other hand, a weight set for beamforming of large-scale MIMO (three-dimensional beamforming) may be divided into a first weight set for acquiring directivity in the horizontal direction, a second weight set for acquiring directivity in the vertical direction, and a third weight set for phase adjustment of dual layer MIMO.

(c) Change in Environment Due to Large-Scale MIMO Beamforming

When large-scale MIMO beamforming is performed, the gain reaches 10 dB or more. In a cellular system employing the above beamforming, a significant change in radio wave environment may occur compared to a conventional cellular system.

(d) Case where Large-Scale MIMO Beamforming is Performed

For example, a base station in urban areas may form a beam aimed at a high-rise building. Also, even in rural areas, a base station of a small cell may form a beam aimed at an area around the base station. Note that it is highly likely that a base station of a macro-cell in rural areas does not perform large-scale MIMO beamforming.

Figure 2:
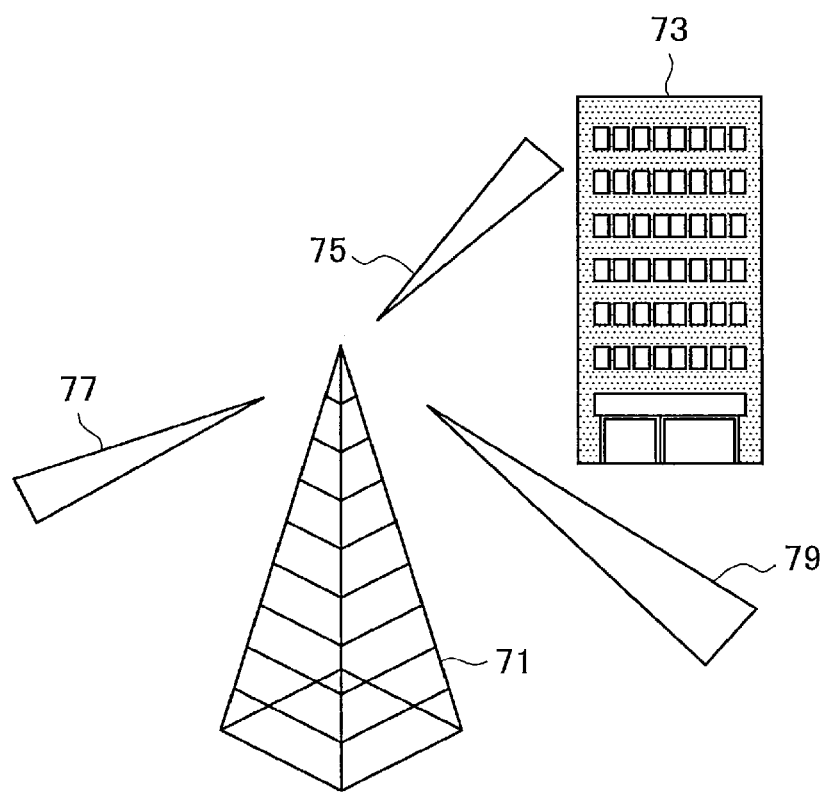
FIG. 2 is a diagram for describing an example of a case in which beamforming of large-scale MIMO is performed.

FIG. 2 is a diagram for describing an example of a case in which beamforming of large-scale MIMO is performed. Referring to FIG. 2, a base station 71 and a high-rise building 73 are illustrated. For example, the base station 71 forms a directional beam 79 toward the high-rise building 73 in addition to directional beams 75 and 77 toward the ground.

(2) Measurement

Measurement includes measurement for selecting a cell and measurement for feeding back a channel quality indicator (CQI) and the like after connection. The latter is required to be performed in a shorter time. Measurement of an amount of interference from a neighbor cell as well as measurement of quality of a serving cell may be considered as a kind of such CQI measurement.

(a) CQI Measurement

Although a cell-specific reference signal (CRS) may be used for CQI measurement, a channel state information reference signal (CSI-RS) has mainly been used for CQI measurement since release 10.

A CSI-RS is transmitted without beamforming, similar to a CRS. That is, the CSI-RS is transmitted without being multiplied by a weight set for beamforming, similar to a CRS. A specific example of this will be described with reference to FIG. 3.

Figure 3:
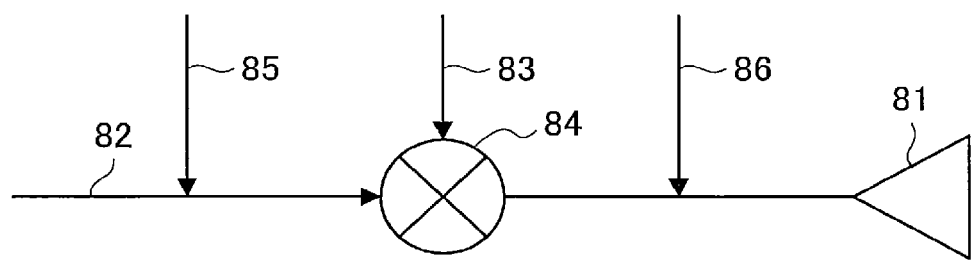
FIG. 3 is a diagram for describing a relationship between multiplication of weight coefficients and insertion of a reference signal.

FIG. 3 is a diagram for describing the relationship between multiplication of weight coefficients and insertion (or mapping) of a reference signal. Referring to FIG. 3, a transmission signal 82 corresponding to each antenna element 81 is complex-multiplied by a weight coefficient 83 by a multiplier 84. Thereafter, the transmission signal 82 complex-multiplied by the weight coefficient 83 is transmitted from the antenna element 81. Also, a DR-MS 85 is inserted before the multiplier 84, and is complex-multiplied by the weight coefficient 83 by the multiplier 84. Thereafter, the DR-MS 85 complex-multiplied by the weight coefficient 83 is transmitted from the antenna element 81. Meanwhile, a CSI-RS 86 (and a CRS) is inserted after the multiplier 84. Thereafter, the CSI-RS 86 (and the CRS) is transmitted from the antenna element 81 without being multiplied by the weight coefficient 83.

Since a CSI-RS is transmitted without beamforming as described above, a pure channel (or a channel response H) which is not affected by beamforming is estimated when measurement of the CSI-RS is performed. This channel H is used and a rank indicator (RI), a precoding matrix indicator (PMI) and a channel quality indicator (CQI) are fed back. Note that only a CQI is fed back depending on a transmission mode. Also, an amount of interference may be fed back.

(b) CSI-RS

Since a CSI-RS is transmitted without beamforming before release 12 as described above, the pure channel H which is not affected by beamforming is estimated when measurement of the CSI-RS is performed. Accordingly, the CSI-RS has been operated like a CRS.

A CRS is used for cell selection, synchronization and the like and thus a CRS transmission frequency is higher than a CSI-RS transmission frequency. That is, a CSI-RS period is longer than a CRS period.

There may be a first approach for transmitting a CSI-RS without beamforming and a second approach for transmitting a CSI-RS with beamforming (i.e., transmitting a CSI-RS over a directional beam) in a large-scale MIMO environment. It can be said that the first approach is a conventional approach and the second approach is a new approach. A relationship between multiplication by a weight coefficient and insertion of a reference signal in the new approach (second approach) will be described below with reference to FIG. 4.

Figure 4:
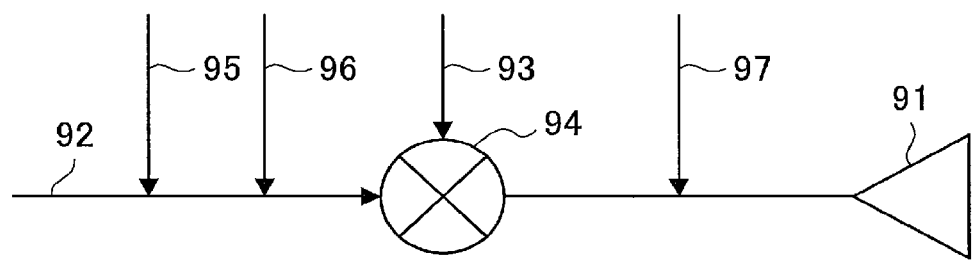
FIG. 4 is a diagram for describing a relationship between multiplication by a weight coefficient and insertion of a reference signal in a new approach.

FIG. 4 is a diagram for describing relationship between multiplication by a weight coefficient and insertion (or mapping) of a reference signal in the new approach. Referring to FIG. 4, a transmission signal 92 corresponding to each antenna element 91 is complex-multiplied by a weight coefficient 93 by a multiplier 94. Thereafter, the transmission signal 92 complex-multiplied by the weight coefficient 93 is transmitted from the antenna element 91. Also, a DR-MS 95 is inserted before the multiplier 94, and is complex-multiplied by the weight coefficient 93 by the multiplier 94. Thereafter, the DR-MS 95 complex-multiplied by the weight coefficient 93 is transmitted from the antenna element 91. Further, a CSI-RS 96 is inserted in front of the multiplier 94, and is complex-multiplied by the weight coefficient 93 in the multiplier 94. Then, the CSI-RS 96 complex-multiplied by the weight coefficient 93 is transmitted from the antenna element 91. Meanwhile, a CRS 97 (and a normal CSI-RS) is inserted after the multiplier 94. Thereafter, the CRS 97 (and the normal CSI-RS) is transmitted from the antenna element 91 without being multiplied by the weight coefficient 93.

<1.2. Consideration Related to Embodiment of Present Disclosure>

Consideration related to an embodiment of the present disclosure will be described with reference to FIGS. 5 to 7.

(1) Interference Between Directional Beams (a) Intra-Cell Interference

In an environment in which directional beams formed by an eNB are not reflected, interference is not generated between directional beams formed by the eNB. On the other hand, in an environment in which directional beams formed by an eNB are reflected, interference may be generated between directional beams formed by the eNB. A specific example of this will be described below with reference to FIGS. 5 and 6.

Figure 5:
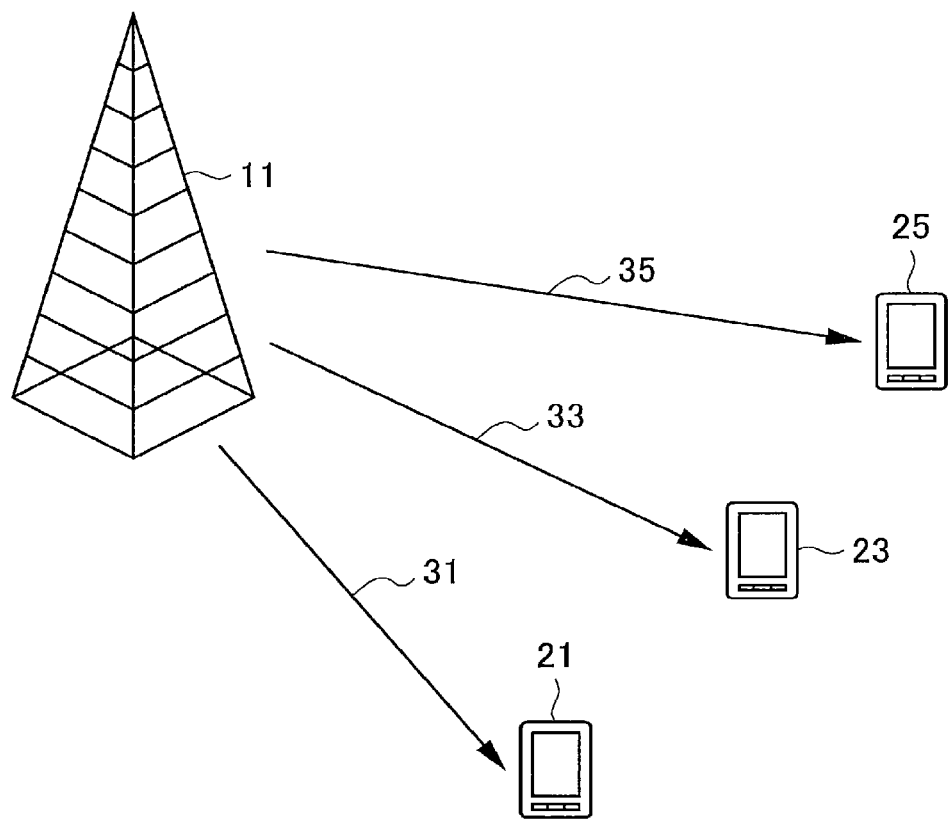
FIG. 5 is a diagram for describing an example of an environment in which directional beams are not reflected.

FIG. 5 is a diagram for describing an example of an environment in which directional beams are not reflected. Referring to FIG. 5, an eNB 11 and UEs 21, 23 and 25 are illustrated. For example, the eNB 11 forms a directional beam 31 directed toward the UE 21, a directional beam 33 directed toward the UE 23 and a directional beam 35 directed toward the UE 25. In this example, the directional beams 31, 33 and 35 are not reflected and interference is not generated among the directional beams 31, 33 and 35.

Figure 6:
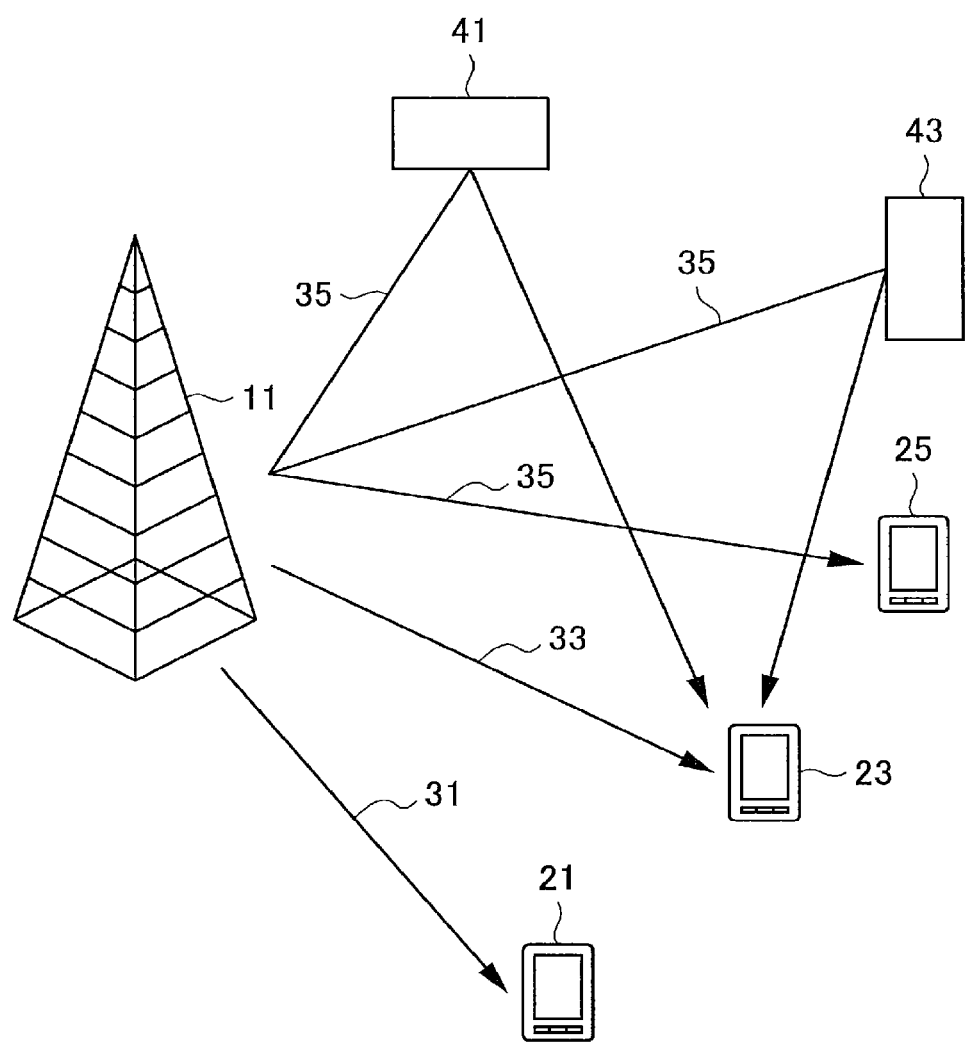
FIG. 6 is a diagram for describing an example of an environment in which directional beams are reflected.

FIG. 6 is a diagram for describing an example of an environment in which directional beams are reflected. Referring to FIG. 6, an eNB 11 and UEs 21, 23 and 25 are shown. Further, obstacles 41 and 43 are shown. For example, the obstacles 41 and 43 are buildings. For example, the eNB 11 forms a directional beam 31 directed toward the UE 21, a directional beam 33 directed toward the UE 23 and directional beams 35 directed toward the UE 25. In this example, the directional beams 35 are reflected by the obstacles 41 and 43 and arrive at the UE 23. Accordingly, interference is generated between the directional beam 33 and the directional beams 35.

(b) Inter-Cell Interference

Not only interference between directional beams in a cell but also interference between directional beams of different cells may be generated. A specific example of this will be described below with reference to FIG. 7.

Figure 7:
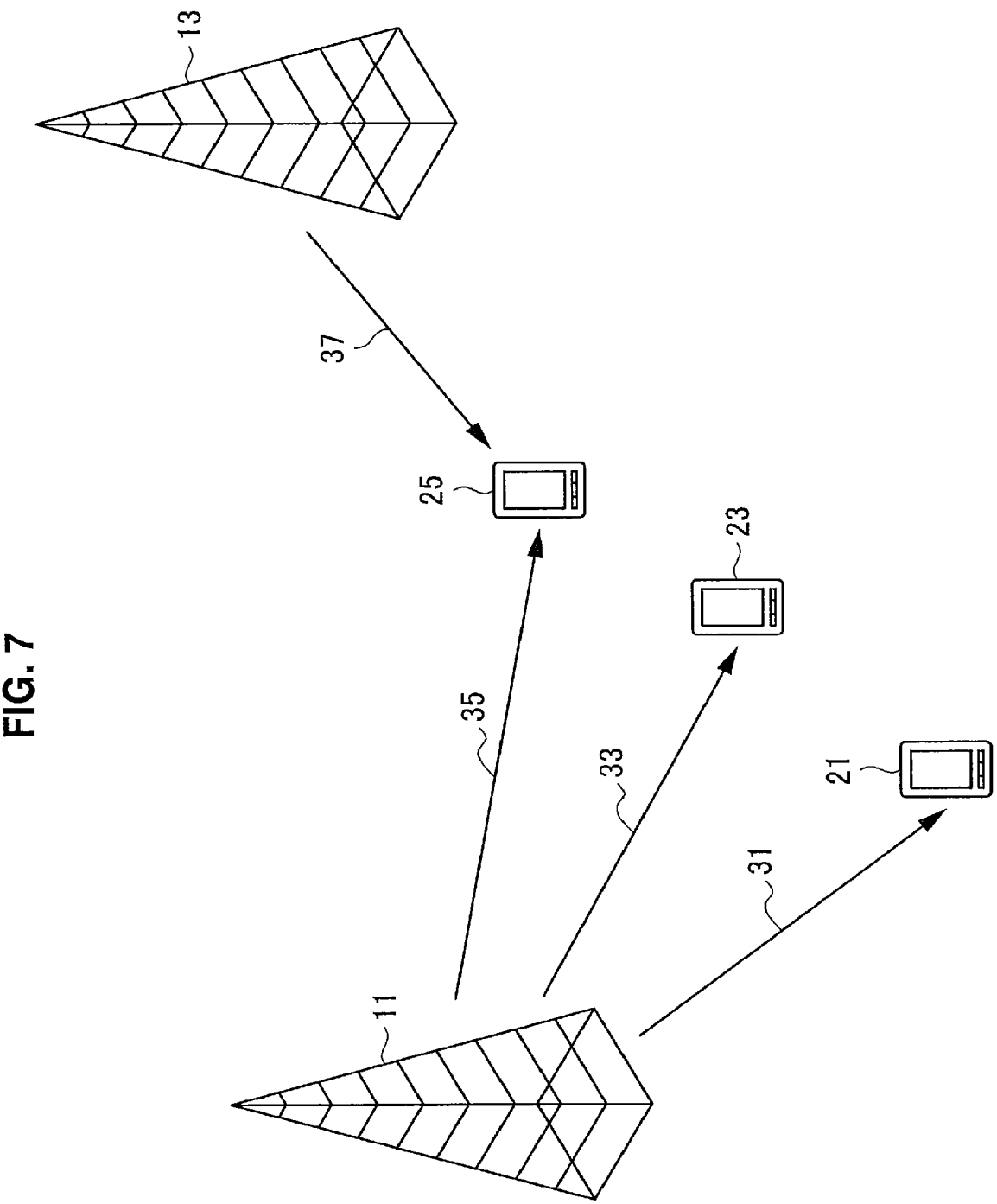
FIG. 7 is a diagram for describing an example of interference between directional beams of different cells.

FIG. 7 is a diagram for describing an example of interference between directional beams of different cells. Referring to FIG. 7, eNBs 11 and 13 and UEs 21, 23 and 25 are shown. For example, the eNB 11 forms a directional beam 31 toward the UE 21, a directional beam 33 toward the UE 23 and a directional beam 35 toward the UE 25. In addition, the eNB 13 forms a directional beam 37 which arrives at the UE 25. Accordingly, interference is generated between the directional beam 35 formed by the eNB 11 and the directional beam 37 formed by the eNB 13.

(c) Deterioration of Received Quality

As described above, when interference of a directional beam in a cell and/or interference of a directional beam between cells are generated, received quality of a UE deteriorates, and thus system throughput may decrease.

Interference may be generated between two directional beams or interference may be generated among three or more directional beams. How many directional beams generate interference varies according to UEs. Referring to FIG. 6, for example, interference is not generated in the UEs 21 and 25, whereas interference is generated among three directional beams in the UE 23. That is, an interference situation varies depending on place.

It can be said that a single operating band includes a high frequency band (component carriers) and a low frequency band (component carriers) but interference situations in the frequency bands are nearly the same.

(2) Required Countermeasures

When only a desired directional beam arrives at a UE, the UE can obtain high received quality. On the other hand, when not only a desired directional beam but also other directional beams arrive at a UE, received quality of the UE may deteriorate.

In order to suppress such interference, first of all, it is important for an eNB to ascertain a situation of interference of a directional beam. A UE reporting a situation of interference of a directional beam to the eNB is considered because the eNB cannot be aware of the situation of such interference of the directional beam. For example, calculating an amount of interference of a directional beam other than a desired directional beam from a CSI-RS is considered. Also, use of a CSI feedback procedure is considered.

In general, there are two types of channel quality measurement. One type is radio resource management (RRM) measurement such as measurement of reference signal received power (RSRP) and reference signal received quality (RSRQ) and the other is measurement for deciding an RI, a CQI, a PMI and the like included in CSI. The former is mainly performed for cell selection by both a UE in an RRC idle mode and a UE in an RRC connected mode. On the other hand, the latter is performed to recognize an interference situation by a UE in an RRC connected mode.

(3) CSI-RS

A CSI-RS is defined in release 10. A normal CSI-RS is also referred to as a non-zero-power CSI-RS. The purpose of the CSI-RS is to acquire a pure channel and thus the CSI-RS is transmitted without beamforming.

Also, a zero-power CSI-RS is defined. The zero-power CSI-RS is defined in order to enable easy observation of relatively weak signals from other eNBs. Since an eNB does not transmit a signal in radio resources (resource elements) for the zero-power CSI-RS, a UE can receive signals from other eNBs in the radio resources.

A CSI-RS period is variable between 5 ms and 80 ms. In addition, 400 radio resources are prepared in one subframe as candidates for radio resources in which the CSI-RS is transmitted.

Conventionally, only one CSI-RS is configured for one cell. On the other hand, a plurality of zero-power CSI-RSs can be configured for one cell. Accordingly, when a serving eNB of a UE configures a zero-power CSI-RS in accordance with a configuration of a CSI-RS of a neighbor eNB, the UE can perform measurement of the CSI-RS of the neighbor eNB without being affected by a signal from the serving eNB.

Note that a CSI-RS configuration is cell-specific. A UE may be notified of the configuration through signaling of a higher layer.

2. Schematic Configuration of System

Figure 8:
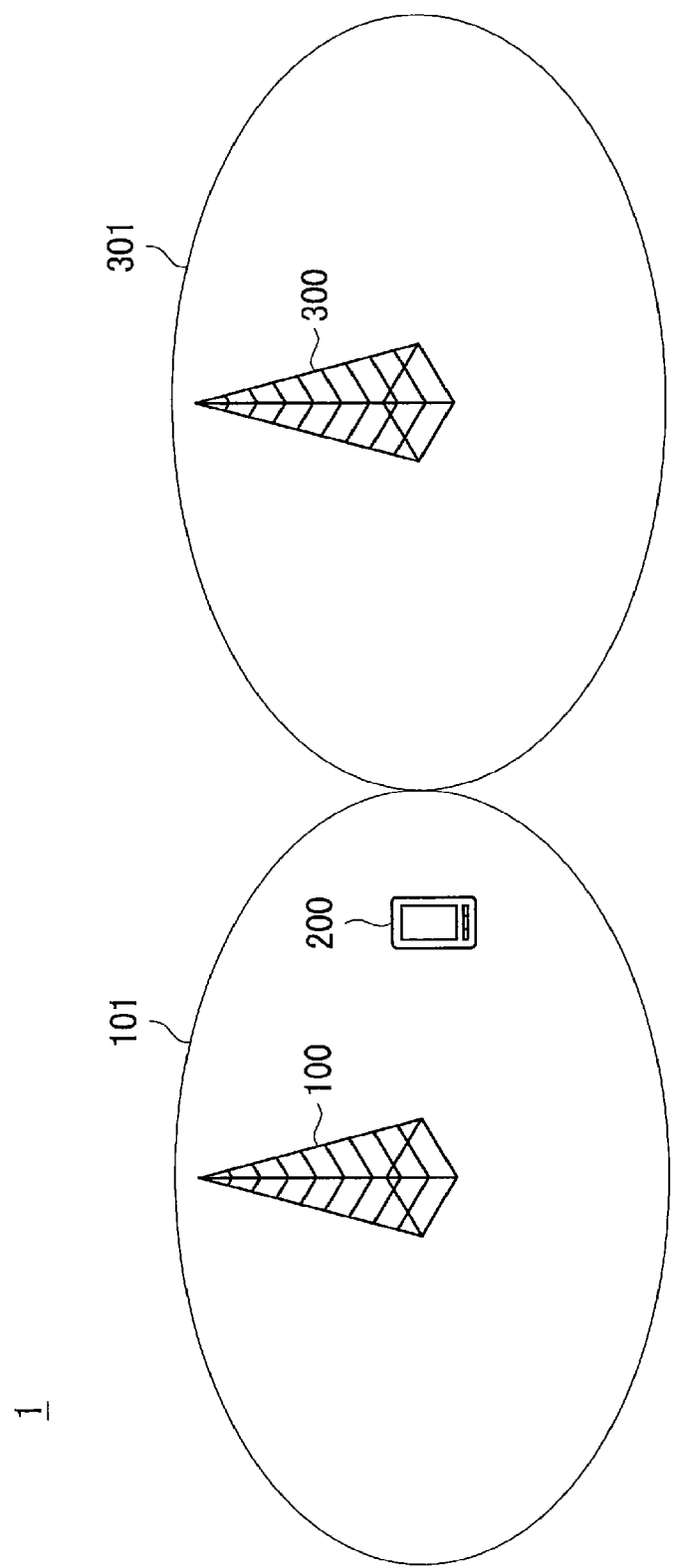
FIG. 8 is a diagram for describing an example of a schematic configuration of a system according to an embodiment of the present disclosure.

Next, a schematic configuration of a communication system 1 according to an embodiment of the present disclosure will be described with reference to FIG. 8. FIG. 8 is a diagram for describing an example of the schematic configuration of the communication system 1 according to an embodiment of the present disclosure. Referring to FIG. 8, the system 1 includes a base station 100, a terminal apparatus 200, and a neighbor base station 300. The system 1 is a system which complies with, for example, LTE, LTE-Advanced, or similar communication standards.

(Base Station 100)

The base station 100 performs wireless communication with the terminal apparatuses 200. For example, the base station 100 performs wireless communication with the terminal apparatuses 200 located in a cell 101 of the base station 100.

Particularly, in an embodiment of the present disclosure, the base station 100 performs beamforming. For example, the beamforming is beamforming of large-scale MIMO. The beamforming may also be referred to as beamforming of massive MIMO, beamforming of free dimension MIMO or three-dimensional beamforming. Specifically, for example, the base station 100 includes a directional antenna usable for large-scale MIMO and performs beamforming of large-scale MIMO by multiplying a transmission signal by a weight set for the directional antenna.

Further, in an embodiment of the present disclosure, particularly, the base station 100 transmits a reference signal for channel quality measurement over a directional beam. For example, the reference signal is a CSI-RS.

(Terminal Apparatus 200)

The terminal apparatus 200 performs wireless communication with a base station. For example, the terminal apparatus 200 performs wireless communication with the base station 100 when located within the cell 101 of the base station 100. For example, the base station 200 performs wireless communication with a neighbor base station 300 when located within a cell 301 of the neighbor base station 300.

For example, the terminal apparatus 200 is connected to the base station 100. That is, the base station 100 is a serving base station of the terminal apparatus 200 and the cell 101 is a serving cell of the terminal apparatus 200.

(Neighbor Base Station 300)

The neighbor base station 300 is a neighbor base station of the base station 100. For example, the neighbor base station 300 has the same configuration as the base station 100 and performs the same operation as the base station 100.

Although FIG. 8 shows only one neighbor base station 300, the system 1 may, of course, include a plurality of neighbor base stations 300.

Note that both the base station 100 and the neighbor base station 300 may be macro base stations. Alternatively, both the base station 100 and the neighbor base station 300 may be base stations of small cells. Alternatively, one of the base station 100 and the neighbor base station 300 may be a macro base station and the other may be a base station of a small cell.

3. Configuration of Each Apparatus

Figure 9:
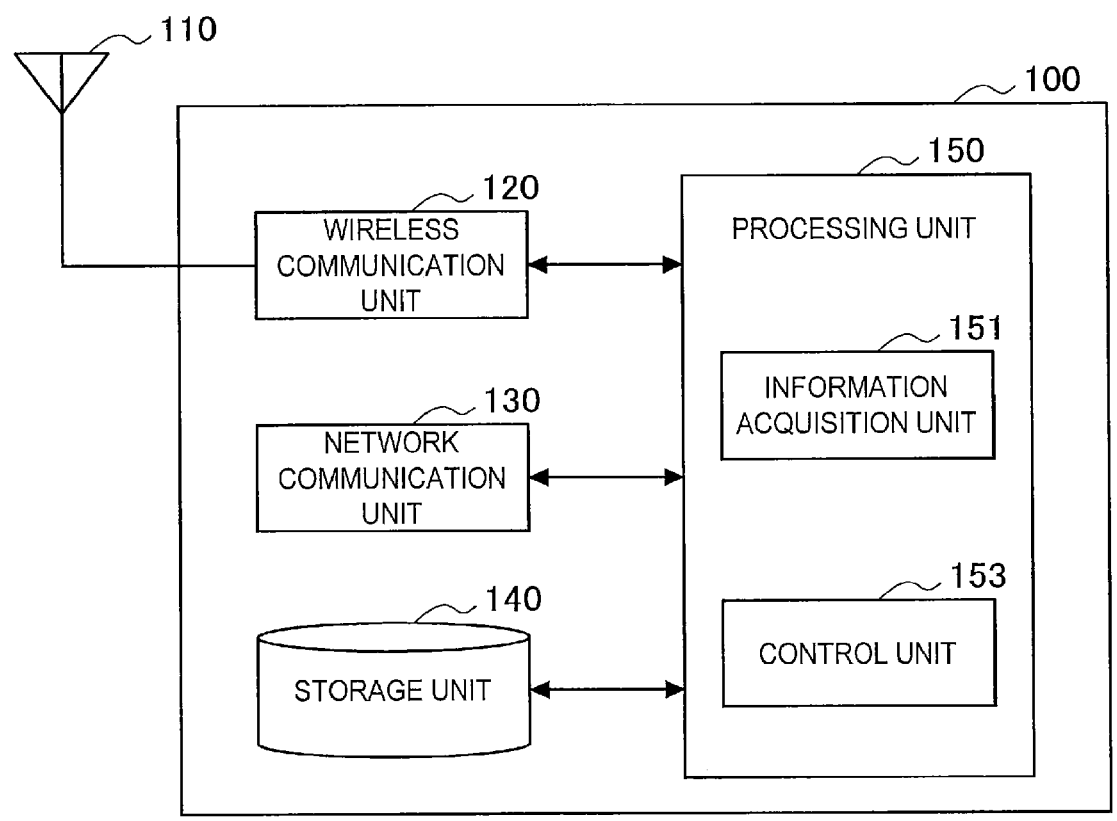
FIG. 9 describes an example of a configuration of a base station according to the present embodiment.
Figure 10:
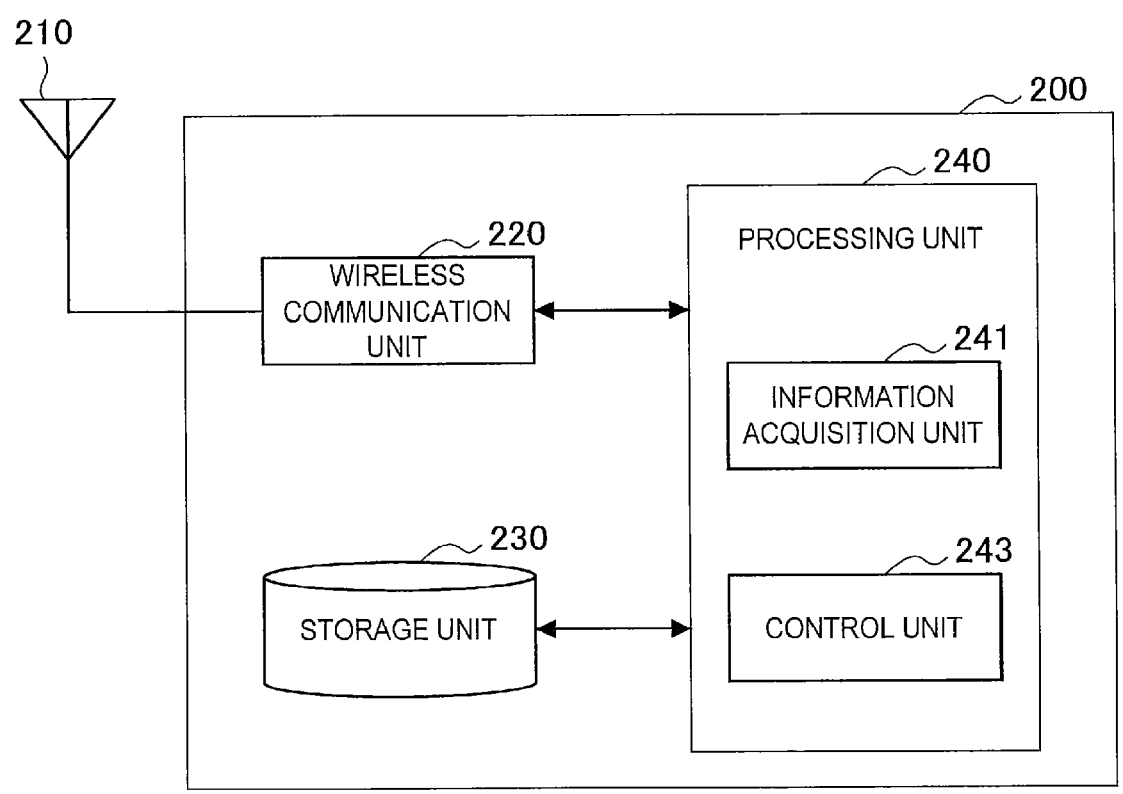
FIG. 10 is a block diagram illustrating an example of a configuration of a terminal apparatus according to the present embodiment.

Next, examples of configurations of the base station 100 and the terminal apparatus 200 will be described with reference to FIGS. 9 and 10.

<3.1. Configuration of Base Station>

First of all, an example of the configuration of the base station 100 according to an embodiment of the present disclosure will be described with reference to FIG. 9. FIG. 9 is a block diagram showing an example of the configuration of the base station 100 according to the embodiment of the present disclosure. Referring to FIG. 9, the base station 100 includes an antenna unit 110, a wireless communication unit 120, a network communication unit 130, a storage unit 140, and a processing unit 150.

(Antenna Unit 110)

The antenna unit 110 radiates a signal output by the wireless communication unit 120, in the form of radio waves, into space. The antenna unit 110 also converts radio waves in space into a signal, and outputs the signal to the wireless communication unit 120.

For example, the antenna unit 110 includes a directional antenna. For example, the directional antenna is a directional antenna which can be used in large-scale MIMO.

(Wireless Communication Unit 120)

The wireless communication unit 120 transmits and receives signals. For example, the wireless communication unit 120 transmits a downlink signal to the terminal apparatus 200 and receives an uplink signal from the terminal apparatus 200.

(Network Communication Unit 130)

The network communication unit 130 transmits and receives information. For example, the network communication unit 130 transmits information to other nodes and receives information from other nodes. For example, the other nodes include other base stations (for example, neighbor base station 300) and a core network node.

(Storage Unit 140)

The storage unit 140 stores programs and data for operation of the base station 100.

(Processing Unit 150)

The processing unit 150 provides various functions of the base station 100. The processing unit 150 includes an information acquisition unit 151 and a control unit 153. Note that the processing unit 150 may further include other components in addition to such components. That is, the processing unit 150 may perform operations other than operations of such components.

Specific operations of the information acquisition unit 151 and the control unit 153 will be described below in detail.

<3.2. Configuration of Terminal Apparatus>

Next, an example of the configuration of the terminal apparatus 200 according to an embodiment of the present disclosure will be described with reference to FIG. 10. FIG. 10 is a block diagram for showing an example of the configuration of the terminal apparatus 200 according to the embodiment of the present disclosure. Referring to FIG. 10, the terminal apparatus 200 includes an antenna unit 210, a wireless communication unit 220, a storage unit 230 and a processing unit 240.

(Antenna Unit 210)

The antenna unit 210 radiates a signal output by the wireless communication unit 220, in the form of radio waves, into space. The antenna unit 210 also converts radio waves in space into a signal, and outputs the signal to the wireless communication unit 220.

(Wireless Communication Unit 220)

The wireless communication unit 220 transmits and receives signals. For example, the wireless communication unit 220 receives a downlink signal from the base station 100 and transmits an uplink signal to the base station 100.

(Storage Unit 230)

The storage unit 230 stores a program and data for operation of the terminal apparatus 200.

(Processing Unit 240)

The processing unit 240 provides various functions of the terminal apparatus 200. The processing unit 240 includes an information acquisition unit 241 and a control unit 243. Note that the processing unit 240 may further include other components in addition to such components. That is, the processing unit 240 may also perform operations other than operations of such components.

Specific operations of the information acquisition unit 241 and the control unit 243 will be described below in detail.

4. First Embodiment

Next, a first embodiment of the present disclosure will be described with reference to FIGS. 11 and 12.

<4.1. Technical Problems>

First of all, technical problems according to the first embodiment will be described.

For example, a CSI-RS is transmitted without beamforming. In this case, signal intensity of the CSI-RS is low and it may be difficult to perform measurement of the CSI-RS (e.g., calculation of an amount of interference of a directional beam). Accordingly, transmitting the CSI-RS, for example, over a directional beam is considered. For example, when large-scale MIMO is applied, the CSI-RS may be transmitted over a directional beam of large-scale MIMO.

For example, a weight set for forming a directional beam of large-scale MIMO may be divided into a first weight set for acquiring directivity in the horizontal direction, a second weight set for acquiring directivity in the vertical direction and a third weight set for phase adjustment of dual layer MIMO.

However, a value calculated as an amount of interference of a directional beam may vary depending on whether the third weight set is one of a plurality of weight sets. Accordingly, for example, a smaller amount of interference than the amount of interference which can actually be generated may be acquired. Consequently, a directional beam that deteriorates received quality is not recognized and thus interference may be continuously generated.

Accordingly, it is desirable to provide a system which enables more appropriate recognition of a situation of interference of a directional beam.

<4.2. Technical Features>

Next, technical features according to the first embodiment will be described with reference to FIG. 11.

In the first embodiment, the base station 100 (information acquisition unit 151) acquires a weight set for forming a directional beam. Then, the base station 100 (control unit 153) multiplies a reference signal for channel quality measurement by the weight set. Consequently, the base station 100 transmits the reference signal over the directional beam. Note that, for example, the base station 100 (control unit 153) notifies the terminal apparatus 200 of the configuration of the reference signal.

In addition, in the first embodiment, the terminal apparatus 200 (information acquisition unit 241) acquires information indicating a configuration of a reference signal for channel quality measurement multiplied by a weight set for forming a directional beam. Then, the terminal apparatus 200 (control unit 243) calculates an amount of interference of the directional beam from the reference signal multiplied by the weight set.

(1) Reference Signal

For example, the reference signal is a channel state information reference signal (CSI-RS).

(2) Weight Set

In the first embodiment, particularly, the weight set is a weight set which may be generated from a first weight set for acquiring directivity in a first direction, a second weight wet for acquiring directivity in a second direction and a third weight set for phase adjustment of dual layer MIMO. In other words, the weight set is a weight set that may be divided into the first weight set, the second weight set and the third weight set. For example, the weight set is a weight set of large-scale MIMO.

(a) First Weight Set and Second Weight Set

For example, the first direction and the second direction are orthogonal to each other. More specifically, the first direction is the horizontal direction and the second direction is the vertical direction, for example. That is, the first weight set is a weight set for acquiring directivity in the horizontal direction and the second weight set is a weight set for acquiring directivity in the vertical direction.

Note that the first weight set is any one of a plurality of weight sets for acquiring directivity in the first direction (e.g., horizontal direction). Also, the second weight set is any one of a plurality of weight sets for acquiring directivity in the second direction (e.g., vertical direction).

(b) Third Weight Set

As described above, the third weight set is a third weight set for phase adjustment of dual layer MIMO. For example, the third weight set is a weight set for phase adjustment between two antenna subarrays corresponding to different polarized waves. More specifically, the third weight set is a weight set for phase adjustment between a first antenna subarray including an antenna element for horizontally polarized waves and a second antenna subarray including an antenna element for vertically polarized waves, for example.

In the first embodiment, particularly, the third weight set is a specific one of a plurality of weight sets for phase adjustment of dual layer MIMO. For example, the specific one of the plurality of weight sets is a weight set that does not adjust a phase between the two antenna subarrays (i.e., a weight set that maintains a phase between the two antenna subarrays). Note that the specific one of the plurality of weight sets may be statically decided or semi-statically decided.

(3) Multiplication by Weight Set

As described above, the base station 100 (control unit 153) multiplies the reference signal for channel quality measurement by the weight set. Hereinafter, an example of multiplication by a weight set according to the first embodiment will be described with reference to FIG. 11.

Figure 11:
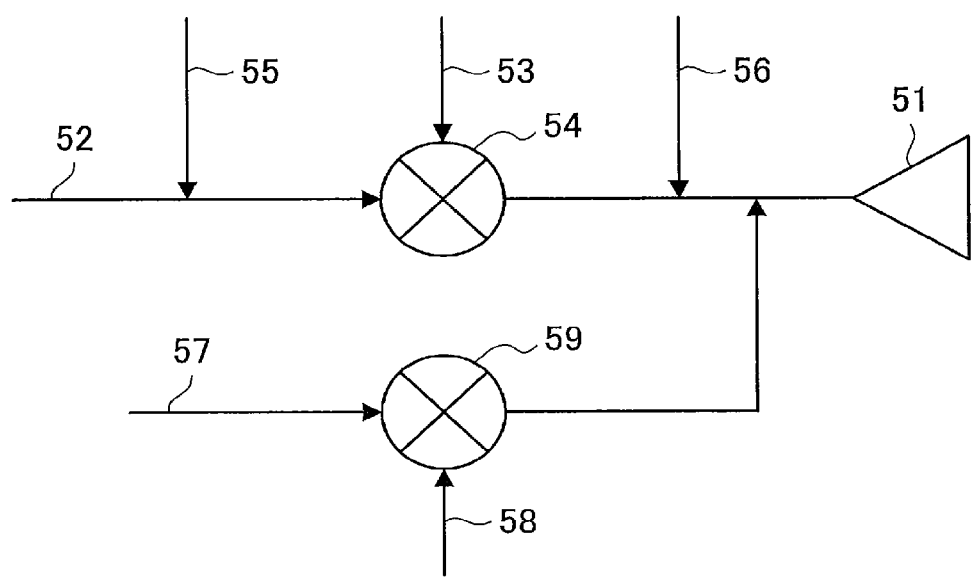
FIG. 11 is a diagram for describing an example of multiplication by a weight set according to a first embodiment.
Figure 12:
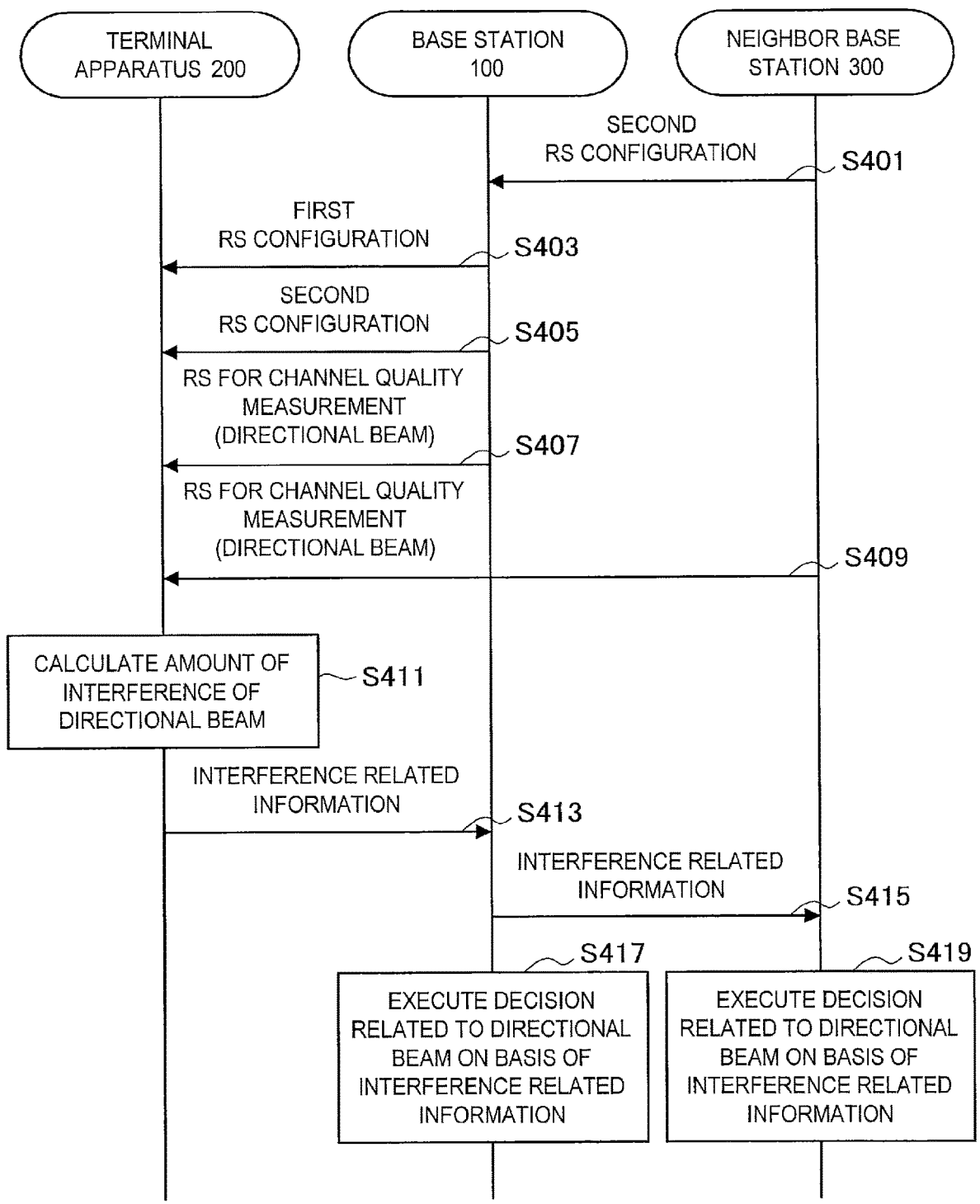
FIG. 12 is a sequence diagram illustrating an example of a schematic flow of a process according to the first embodiment.

FIG. 11 is a diagram for describing an example of multiplication by weight sets according to the first embodiment. Referring to FIG. 11, a transmission signal 52 corresponding to each antenna element 51 is complex-multiplied by a weight coefficient 53 by a multiplier 54. Thereafter, the transmission signal 52 complex-multiplied by the weight coefficient 53 is transmitted from the antenna element 51. Also, a DR-MS 55 is inserted in front of the multiplier 54, and is complex-multiplied by the weight coefficient 53 by the multiplier 54. Thereafter, the DR-MS 55 complex-multiplied by the weight coefficient 53 is transmitted from the antenna element 51. A CRS 56 is inserted after the multiplier 54. Thereafter, the CRS 56 is transmitted from the antenna element 51 without being multiplied by the weight coefficient 53. In this example, particularly, a CSI-RS 57 is inserted in front of the multiplier 59 and complex-multiplied by a weight coefficient 58 by the multiplier 59. Thereafter, the CSI-RS 57 complex-multiplied by the weight coefficient 58 is transmitted from the antenna element 51. Here, the weight coefficient 53 is, for example, a weight coefficient included in a weight set which may be generated from any weight set for acquiring directivity in the horizontal direction, any weight set for acquiring directivity in the vertical direction and any weight set for phase adjustment of dual layer MIMO. On the other hand, the weight coefficient 58 is a weight coefficient included in a weight set which may be generated from any weight set for acquiring directivity in the horizontal direction, any weight set for acquiring directivity in the vertical direction and a specific weight set for phase adjustment of dual layer MIMO.

Note that the base station 100 may transmit a normal CSI-RS that is not multiplied by a weight set in addition to the CSI-RS 57. The normal CSI-RS may be transmitted through a radio resource (e.g., a resource element) different from the CSI-RS 57. Accordingly, a legacy terminal, for example, may also perform measurement of the CSI-RS.

(4) Notification of Configuration of Reference Signal

As described above, the base station 100 (control unit 153), for example, notifies the terminal apparatus 200 of the configuration of the reference signal.

(a) Notification Method

More specifically, the base station 100 (control unit 153) notifies the terminal apparatus 200 of the configuration, for example, through individual signaling to the terminal apparatus 200. That is, the base station 100 (control unit 153) generates a signaling message (e.g., an RRC message) including information indicating the configuration. Thereafter, the base station 100 transmits the signaling message to the terminal apparatus 200.

Alternatively/further, the base station 100 (control unit 153) may notify the terminal apparatus 200 of the configuration in system information. That is, the base station 100 (control unit 153) may generate system information (e.g., a system information block) including information indicating the configuration. Thereafter, the base station 100 may transmit the system information to the terminal apparatus 200.

For example, the base station 100 (control unit 153) notifies the terminal apparatus 200 of the configuration as a configuration of a non-zero-power CSI-RS.

(b) Contents of Configuration

The configuration includes at least one of a radio resource used to transmit the reference signal and a sequence of the reference signal. For example, the configuration includes both the radio resource and the sequence. For example, the radio resource is one or more resource elements.

As described above, the base station 100 (control unit 153) notifies the terminal apparatus 200 of the configuration. Accordingly, for example, the terminal apparatus 200 connected to the base station 100 can perform measurement of the reference signal (e.g., a CSI-RS) transmitted by the base station 100. For example, the terminal apparatus 200 connected to the base station 100 can calculate an amount of interference of a directional beam formed by the base station 100.

(5) Calculation of Amount of Interference

As described above, the terminal apparatus 200 (control unit 243) calculates an amount of interference of a directional beam (i.e., an amount of interference from a directional beam) from the reference signal multiplied by the weight set.

For example, the terminal apparatus 200 (control unit 243) estimates a channel from the reference signal and calculates the amount of the interference on the basis of the channel and the plurality of weight sets.

More specifically, the base station 100 transmits a CSI-RS over a directional beam by multiplying the CSI-RS by a weight set V, for example. The weight set V is a weight set which may be generated from a weight set V1 for acquiring directivity in the horizontal direction, a weight set V2 for acquiring directivity in the vertical direction and a specific weight set V3(0) for phase adjustment of dual layer MIMO. In other words, the weight set V may be divided into the weight sets V1, V2 and V3(0). The terminal apparatus 200 estimates a channel H' (or a channel response H') from the CSI-RS multiplied by the weight set V. Thereafter, the terminal apparatus 200 calculates an amount of interference I(i) when the CSI-RS is multiplied by a weight set which may be generated from the weight sets V1, V2 and V3(i) on the basis of the channel H' and V3(i), for example, as follows.

$$I(i) = H'V3(0)^{-1}V3(i) \quad [\text{Math. 3}]$$

Note that the amount of interference I(i) may be calculated as follows when the weight set V3(0) is a weight set that does not adjust a phase between two antenna subarrays (i.e., maintains the phase as it is).

$$I(i) = H'V3(i) \quad [\text{Math. 4}]$$

When the number of weight sets V3(i) is set to N, for example, the terminal apparatus 200 calculates the average value of i as an amount of interference I of a directional beam as follows.

$$I = \frac{\sum_{i=0}^{N-1} I(i)}{N} = \frac{\sum_{i=0}^{N-1} H'V3(i)}{N} \quad [\text{Math. 5}]$$

Alternatively, the terminal apparatus 200 may calculate a maximum value as follows as the amount of interference I of the directional beam.

$$I = \max_i I(i) = \max_i H'V3(i) \quad \text{[Math. 6]}$$

For example, the terminal apparatus 200 calculates an amount of interference of an individual directional beam, as described above.

Accordingly, it is possible to more appropriately recognize a situation of interference of a directional beam, for example. As an example, it is possible to recognize an average amount of interference of a directional beam. As another example, it is possible to recognize a maximum amount of interference of a directional beam.

Note that the terminal apparatus 200 (control unit 243) may decide an optimal weight set V3(a) among the plurality of weight sets V3(i) (i=0 to N−1) for a desired directional beam. Thereafter, the terminal apparatus 200 (control unit 243) may calculate an optimal channel (H' V3(a)) on the basis of channels and the optimal weight set V3(a) and decide a CQI, RI, PMI and/or the like.

(6) Neighbor Base Station 300

(a) Notification to Neighbor Base Station 300

For example, the base station 100 (control unit 153) notifies the neighbor base station 300 of the configuration of the reference signal.

More specifically, the base station 100 (control unit 153) generates a message including information indicating the configuration. Thereafter, the base station 100 transmits the message through an interface (e.g., an X2 interface) between the base station 100 and the neighbor base station 300.

Accordingly, a terminal apparatus connected to the neighbor base station 300, for example, can perform measurement of the reference signal (e.g., a CSI-RS) transmitted by the base station 100. For example, the terminal apparatus connected to the neighbor base station 300 can calculate an amount of interference of a directional beam formed by the base station 100.

(b) Directional Beam Formed by Neighbor Base Station 300

For example, the neighbor base station 300 notifies the base station 100 of the configuration of a reference signal for channel quality measurement (e.g., a CSI-RS) transmitted by the neighbor base station 300. Then, the base station 100 (control unit 153) notifies the terminal apparatus 200 of the configuration of the reference signal transmitted by the neighbor base station 300. For example, the base station 100 (control unit 153) notifies the terminal apparatus 200 of the configuration as a configuration of a zero-power CSI-RS. Note that the neighbor base station 300 transmits a reference signal for channel quality measurement (e.g., a CSI-RS) as with the base station 100.

Accordingly, the terminal apparatus 200 connected to the base station 100, for example, can perform measurement of the reference signal (e.g., a CSI-RS) transmitted by the neighbor base station 300. For example, the terminal apparatus 200 connected to the base station 100 can calculate an amount of interference of a directional beam formed by the neighbor base station 300.

Note that the terminal apparatus 200 calculates an amount of interference of a directional beam formed by the neighbor base station 300 as in calculation of an amount of interference of a directional beam formed by the base station 100. Description of calculation of the amount of interference is as described above and thus redundant description is omitted here.

(7) Two or More Directional Beams

Of course, the base station 100 transmits a reference signal for channel quality measurement, for example, over two or more directional beams as well as one directional beam. In addition, the terminal apparatus 200 calculates an amount of interference of each of the two or more directional beams.

That is, the base station 100 (information acquisition unit 151) acquires two or more weight sets for forming two or more directional beams. Thereafter, the base station 100 (control unit 153) multiplies two or more reference signals for channel quality measurement by the two or more weight sets. For example, the base station 100 (control unit 153) notifies the terminal apparatus 200 of the configuration of each of the two or more reference signals.

Also, the terminal apparatus 200 (information acquisition unit 241) acquires information indicating the configuration of each of two or more reference signals for channel quality measurement multiplied by two or more weight sets for forming two or more directional beams. Thereafter, the terminal apparatus 200 (control unit 243) calculates an amount of interference of each of the two or more directional beams from the two or more reference signals multiplied by the two or more weight sets.

Each of the two or more weight sets is a weight set that can be generated from a first weight set for acquiring directivity in the first direction, a second weight set for acquiring directivity in the second direction and a third weight set for phase adjustment of dual layer MIMO. Particularly, the third weight set is the specific one of the plurality of weight sets.

For example, the two or more reference signals have different configurations. More specifically, at least one of a radio resource used for transmission and a signal sequence of one of the two or more reference signals is different from that of the other. Accordingly, it is possible to calculate the amount of interference of each of the two or more directional beams, for example.

Note that the neighbor base station 300 also transmits a reference signal for channel quality measurement over two or more directional beams as with the base station 100, and the terminal apparatus 200 calculates an amount of interference of each of the two or more directional beams.

(8) Report

For example, the terminal apparatus 200 (control unit 243) reports information related to interference of a directional beam (referred to hereinafter as "interference related information") to the base station 100.

As an example, the terminal apparatus 200 (control unit 243) reports, to the base station 100, identification information for identifying a directional beam and information indicating the amount of interference of the directional beam as the interference related information. Further, the terminal apparatus 200 (control unit 243) also reports, for example, identification information for identifying a base station (e.g., the base station 100 or the neighbor base station 300) that forms the directional beam as the reference related information. The terminal apparatus 200 (control unit 243) may report the interference related information for each directional beam and may report the interference related information for one or more limited directional beams (e.g., directional beams with large interference).

For example, the base station 100 notifies the terminal apparatus 200 of the configuration of a reference signal for channel quality measurement with identification information for identifying a directional beam of the reference signal. Also, the base station 100 notifies the terminal apparatus 200 of information for identifying a base station that transmits the reference signal, for example.

Note that the terminal apparatus 200 may report, for example, a CQI, an RI and/or a PMI to the base station 100.

<4.3. Processing Flow>

Next, an example of a process according to the first embodiment will be described with reference to FIG. 12. FIG. 12 is a sequence diagram illustrating an example of a schematic flow of the process according to the first embodiment.

The neighbor base station 300 notifies the base station 100 of the configuration of a reference signal for channel quality measurement transmitted by the neighbor base station 300 (referred to hereinafter as "second RS configuration") (S401).

The base station 100 notifies the terminal apparatus 200 of the configuration of a reference signal for channel quality measurement transmitted by the base station 100 (referred to hereinafter as "first RS configuration") and the second RS configuration (S403 and S405). For example, the base station 100 notifies the terminal apparatus 200 of the first RS configuration as a configuration of a non-zero-power CST-RS. Also, the base station 100 notifies the terminal apparatus 200 of the second RS configuration as a configuration of a zero-power CSI-RS, for example. Note that the base station 100 also notifies the terminal apparatus 200 of, for example, identification information for identifying a directional beam of the reference signal and information for identifying a base station that transmits the reference signal.

The base station 100 transmits the reference signal for channel quality measurement over a directional beam by multiplying the reference signal by a weight set for forming the directional beam (S407). Particularly, the weight set is a weight set that may be generated from a first weight set for acquiring directivity in the horizontal direction, a second weight set for acquiring directivity in the vertical direction and a third weight set for phase adjustment of dual layer MIMO. Also, the third weight set is a specific one of a plurality of weight sets for phase adjustment of dual layer MIMO.

The neighbor base station 300 transmits the reference signal for channel quality measurement over a directional beam by multiplying the reference signal by a weight set for forming the directional beam, similar to the base station 100 (S409).

The terminal apparatus 200 calculates an amount of interference of a directional beam from the reference signal (S411). For example, the terminal apparatus 200 estimates a channel from the reference signal and calculates the amount of interference on the basis of the channel and the plurality of weight sets. Thereafter, the terminal apparatus 200 reports information related to the interference of the directional beam (i.e., interference related information) to the base station 100 (S413).

The base station 100 notifies the neighbor base station 300 of interference related information corresponding to the neighbor base station 300 (S415). Also, the base station 100 performs decision with respect to a directional beam (e.g., stopping of a directional beam and the like) on the basis of interference related information corresponding to the base station 100 (S417).

The neighbor base station 300 performs decision with respect to a directional beam (e.g., stopping of a directional beam and the like) on the basis of the interference related information corresponding to the neighbor base station 300 (S419).

5. Second Embodiment

Next, a second embodiment of the present disclosure will be described with reference to FIGS. 13 and 14.

<5.1. Technical Problems>

First of all, technical problems according to the second embodiment will be described.

For example, a CSI-RS is transmitted without beamforming. In this case, signal intensity of a CSI-RS is low, and it may be difficult to perform measurement of the CSI-RS (e.g., calculation of an amount of interference of a directional beam). Accordingly, transmitting the CSI-RS over a directional beam is considered, for example. When large-scale MIMO is applied, for example, a CSI-RS may be transmitted over a directional beam of large-scale MIMO.

However, when a CSI-RS is transmitted over a directional beam (e.g., a directional beam of large-scale MIMO), for example, a terminal apparatus performs measurement of the CSI-RS for each directional beam (e.g., calculation of the amount of interference of the directional beam). Consequently, measurement load in the terminal apparatus may increase.

Accordingly, it is desirable to provide a system which enables suppression of measurement load in a terminal apparatus.

<5.2. Technical Problems>

Next, technical features according to the second embodiment will be described with reference to FIG. 13.

The base station 100 (information acquisition unit 151) acquires measurement restriction information indicating restriction on measurement of a reference signal for channel quality measurement transmitted over a directional beam. Thereafter, the base station 100 (control unit 153) notifies the terminal apparatus 200 of the measurement restriction information.

The terminal apparatus 200 (information acquisition unit 241) acquires the measurement restriction information. Thereafter, the terminal apparatus 200 (control unit 243) performs measurement of a reference signal for channel quality measurement transmitted over a directional beam on the basis of the measurement restriction information.

(1) Reference Signal

For example, the reference signal is a channel state information reference signal (CSI-RS).

(2) Measurement

For example, the measurement of the reference signal is measurement of the amount of interference of the directional beam.

(3) Measurement Restriction Information (a) Beam Number Information

For example, the measurement restriction information includes information indicating the number of directional beams that are measurement targets (referred to hereinafter as "beam number information").

For example, the beam count information is information indicating the number of directional beams (that are measurement targets) per base station. As an example, the beam number information indicates 5. In this case, the terminal apparatus 200 performs measurement of each of five directional beams per base station (i.e., measurement of a reference signal for channel quality measurement transmitted over each of five directional beams) and does not perform measurement of other directional beams. Note that, in this case, the beam count information may be prepared for each base station or the beam count information may be prepared as information common to base stations.

Alternatively, the beam count information may be information indicating the number of directional beams that are measurement targets among directional beams formed by all base stations.

It is possible to restrict, for example, the number of measurements by a terminal apparatus to a desired number according to the beam count information.

(b) Lower Limit Power Information

For example, the measurement restriction information includes information related to a lower limit of power of a directional beam that is a measurement target (referred to hereinafter as "lower limit power information"). For example, the power is received power.

For example, the lower limit power information is information indicating an offset between power of a desired directional beam and the lower limit. As an example, the offset is 25 dB. In this case, the terminal apparatus 200 does not perform measurement of a directional beam having power lower than that of a desired directional beam by 25 dB or more (i.e., measurement of a reference signal for channel quality measurement transmitted over the directional beam). Note that, for example, the terminal apparatus 200 is notified of the desired directional beam by the base station 100.

It is possible to avoid measurement of, for example, a directional beam with low power (i.e., a directional beam that does not generate large interference) according to the lower limit power information.

(c) Priority Information

The measurement restriction information may include information indicating priorities of base stations or directional beams that are measurement targets (referred to hereinafter as "priority information"). In this case, measurement of a reference signal for channel quality measurement transmitted over a directional beam may be performed in accordance with the priorities.

The priority information may indicate priorities of base stations. In this case, the base station 100 may have the highest priority, a neighbor base station 300 closer to the base station 100 may have a relatively high priority, and a neighbor base station 300 farther from the base station 100 may have a lower priority as an example.

Alternatively, the measurement restriction information may indicate priorities of directional beams. In this case, a directional beam formed by the base station 100 may have the highest priority, a directional beam formed by a neighbor base station 300 closer to the base station 100 may have a relatively high priority, and a directional beam formed by a neighbor base station 300 farther from the base station 100 may have a lower priority as an example.

It is possible to perform measurement of a directional beam which generates larger interference more preferentially, for example. Accordingly, it is possible to perform measurement of, for example, a directional beam which generates larger interference and then not to perform measurement of other directional beams.

(d) Example of Measurement Based on Measurement Restriction Information

Figure 13:
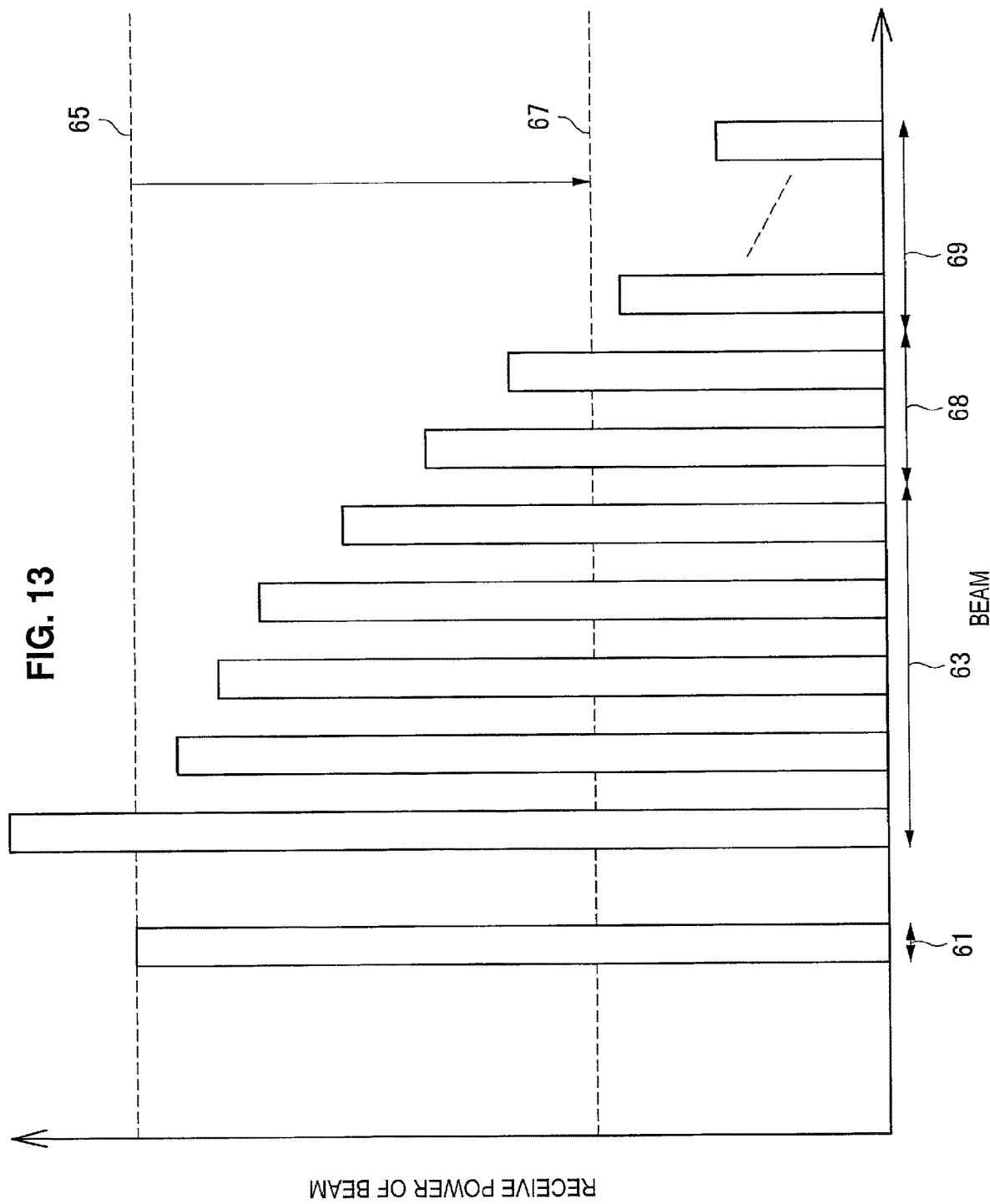
FIG. 13 is a diagram for describing an example of measurement based on measurement restriction information.
Figure 14:
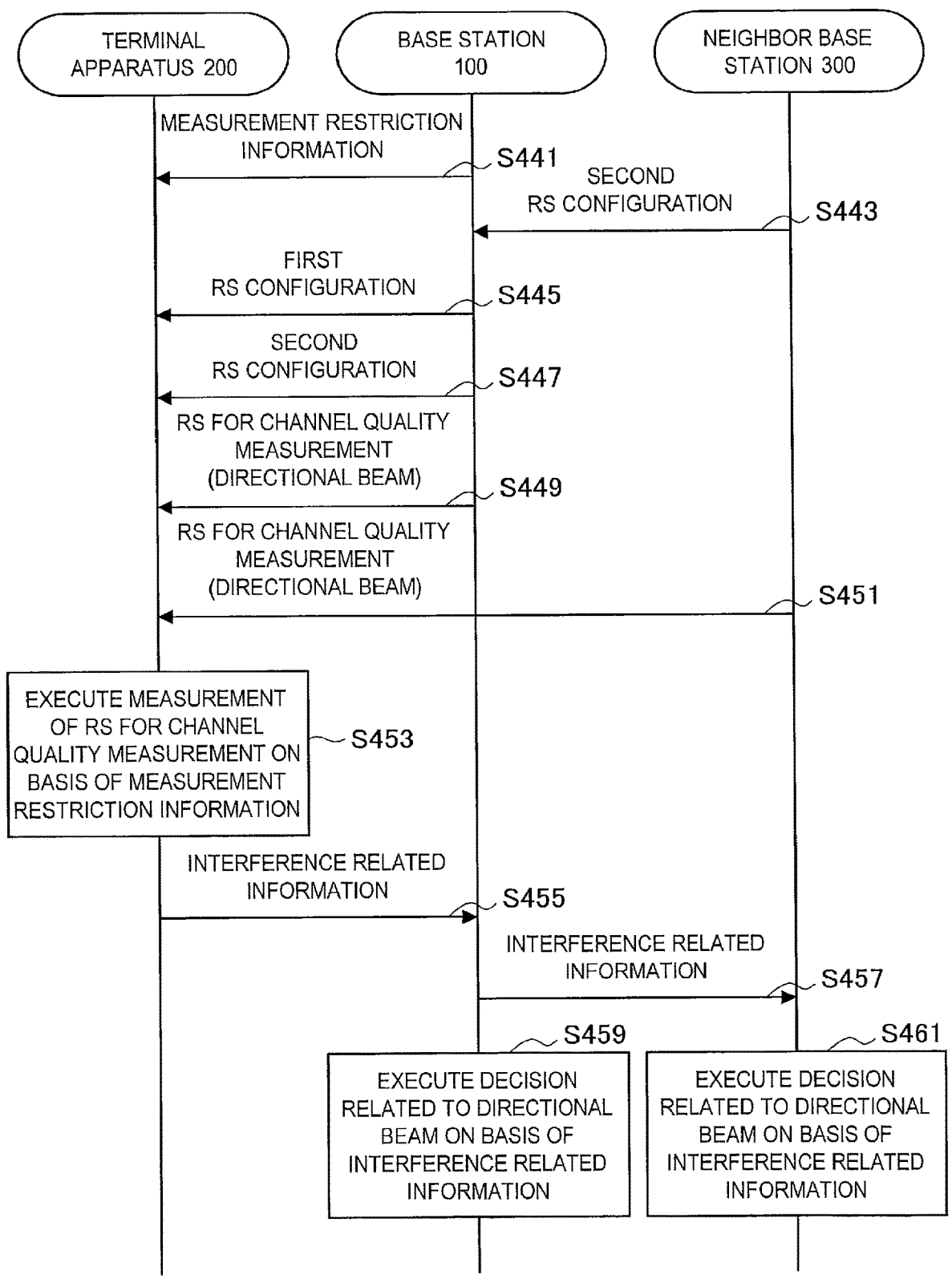
FIG. 14 is a sequence diagram showing an example of a schematic flow of a process according to a second embodiment.

FIG. 13 is a diagram for describing an example of measurement based on the measurement restriction information. Referring to FIG. 13, received power for each directional beam is shown. For example, a lower limit of power of a directional beam that is a measurement target is received power 67 that is 25 dB below received power 65 of a desired directional beam 61. In this case, the terminal apparatus 200 does not perform measurement of directional beams 69 having received power equal to or lower than the received power 67 (or lower than the received power 67). Also, the number of directional beams that are measurement targets is 5 and the terminal apparatus 200 performs measurement of five directional beams 63. The terminal apparatus 200 does not perform measurement of other directional beams 68 having received power higher than the received power 67 (or equal to or higher than the received power 67).

It is possible to suppress, for example, a measurement load in the terminal apparatus 200 according to the measurement restriction information. Specifically, for example, measurement of a directional beam that does not generate large interference can be omitted and measurement of a directional beam that may generate large interference can be performed.

(4) Notification

As described above, the base station 100 (control unit 153) notifies the terminal apparatus 200 of the measurement restriction information.

For example, the base station 100 (control unit 153) notifies the terminal apparatus 200 of the measurement restriction information through individual signaling to the terminal apparatus 200. That is, the base station 100 (control unit 153) generates a signaling message (e.g., an RRC message) including the measurement restriction information. Thereafter, the base station 100 transmits the signaling message to the terminal apparatus 200. Note that, in this case, the measurement restriction information may be information specific to the terminal apparatus 200 or information specific to a cell (base station 100).

Alternatively/further, the base station 100 (control unit 153) may notify the terminal apparatus 200 of the measurement restriction information in system information. That is, the base station 100 (control unit 153) may generate system information (e.g., an SIB) including the measurement restriction information. Thereafter, the base station 100 may transmit the system information to the terminal apparatus 200. Note that, in this case, the measurement restriction information may be information specific to a cell (base station 100).

(5) Others

Information included in the measurement restriction information may be information specific to the terminal apparatus 200.

As an example, the lower limit power information may be information specific to the terminal apparatus 200. Specifically, lower limit power information about the terminal apparatus 200 that supports up to 256 quadrature amplitude modulation (QAM), for example, may indicate 25 dB as an offset. On the other hand, lower limit power information about the terminal apparatus 200 that supports up to 64 QAM may indicate 20 dB as an offset.

<5.3. Processing Flow>

Next, an example of a process according to the second embodiment will be described with reference to FIG. 14. FIG. 14 is a sequence diagram illustrating an example of a schematic flow of the process according to the second embodiment.

The base station 100 acquires measurement restriction information indicating restriction on measurement of a reference signal for channel quality measurement transmitted over a directional beam and notifies the terminal apparatus 200 of the measurement restriction information (S441).

The neighbor base station 300 notifies the base station 100 of the configuration of a reference signal for channel quality measurement transmitted by the neighbor base station 300 (referred to hereinafter as "second RS configuration") (S443).

The base station 100 notifies the terminal apparatus 200 of the configuration of a reference signal for channel quality measurement transmitted by the base station 100 (referred to hereinafter as "first RS configuration) and the second RS configuration (S445 and S447). For example, the base station 100 notifies the terminal apparatus 200 of the first RS configuration as a configuration of a non-zero-power CSI-RS. Also, the base station 100 notifies the terminal apparatus 200 of the second RS configuration as a configuration of a zero-power CSI-RS, for example. Note that the base station 100 also notifies the terminal apparatus 200 of, for example, identification information for identifying a directional beam of the reference signal and information for identifying a base station that transmits the reference signal.

The base station 100 transmits a reference signal for channel quality measurement over a directional beam by multiplying the reference signal by a weight set for forming the directional beam (S449). The neighbor base station 300 also transmits a reference signal for channel quality measurement over a directional beam by multiplying the reference signal by a weight set for forming the directional beam (S451).

The terminal apparatus 200 acquires the measurement restriction information. Thereafter, the terminal apparatus 200 performs measurement of a reference signal for channel quality measurement transmitted over a directional beam on the basis of the measurement restriction information (S453). For example, the measurement is measurement of the amount of interference of the directional beam. Thereafter, the terminal apparatus 200 reports information related to interference of a directional beam (i.e., interference related information) to the base station 100 (S455).

The base station 100 notifies the neighbor base station 300 of interference related information corresponding to the neighbor base station 300 (S457). Also, the base station 100 performs decision with respect to a directional beam (e.g., stopping of a directional beam, and the like) on the basis of interference related information corresponding to the base station 100 (S459).

The neighbor base station 300 performs decision with respect to a directional beam (e.g., stopping of a directional beam, and the like) on the basis of the interference related information corresponding to the neighbor base station 300 (S461).

<5.4. Modified Example>

In the above-described example according to the second embodiment, the base station 100 notifies the terminal apparatus 200 of the measurement restriction information and the terminal apparatus 200 performs the measurement on the basis of the measurement restriction information.

As a modified example of the second embodiment, the base station 100 does not notify the terminal apparatus 200 of the measurement restriction information, and the measurement restriction information may be previously stored in the terminal apparatus 200. Then, the terminal apparatus 200 may perform the measurement on the basis of the measurement restriction information previously stored in the terminal apparatus 300.

The second embodiment has been described above. Note that the second embodiment may be combined with the first embodiment. Specifically, the base station 100 (the information acquisition unit 151 and the control unit 153) according to the first embodiment may perform operations of the base station 100 (the information acquisition unit 151 and the control unit 153) according to the second embodiment in a similar manner. Also, the terminal apparatus 200 (the information acquisition unit 241 and the control unit 243) according to the first embodiment may perform operations of the terminal apparatus 200 (the information acquisition unit 241 and the control unit 243) according to the second embodiment in a similar manner.

6. Application Examples

The technique according to the present disclosure is applicable to various products. The base station 100 may also be implemented, for example, as any type of evolved Node B (eNB) such as macro eNBs and small eNBs. Small eNBs may cover smaller cells than the macrocells of pico eNBs, micro eNBs, or home (femt) eNBs. Instead, the base station 100 may be implemented as another type of base station such as Nodes B or base transceiver stations (BTSs). The base station 100 may include the main apparatus (which is also referred to as base station apparatus) that controls wireless communication and one or more remote radio heads (RRHs) that are disposed at different locations from that of the main apparatus. Also, various types of terminals described below may function as the base station 100 by temporarily or semi-permanently executing the functionality of the base station. Furthermore, at least some of components of the base station 100 may be realized in a base station apparatus or a module for a base station apparatus.

Further, the terminal apparatus 200 may be implemented as a mobile terminal such as smartphones, tablet personal computers (PCs), notebook PCs, portable game terminals, portable/dongle mobile routers, and digital cameras, or an in-vehicle terminal such as car navigation apparatuses. The terminal apparatus 200 may be implemented as a machine type communication (MTC) for establishing a machine to machine communication (M2M). Furthermore, at least some of components of the terminal apparatus 200 may be implemented as a module (e.g. integrated circuit module constituted with a single die) that is mounted on these terminals.

<6.1. Application Examples for Base Station>

First Application Example

Figure 15:
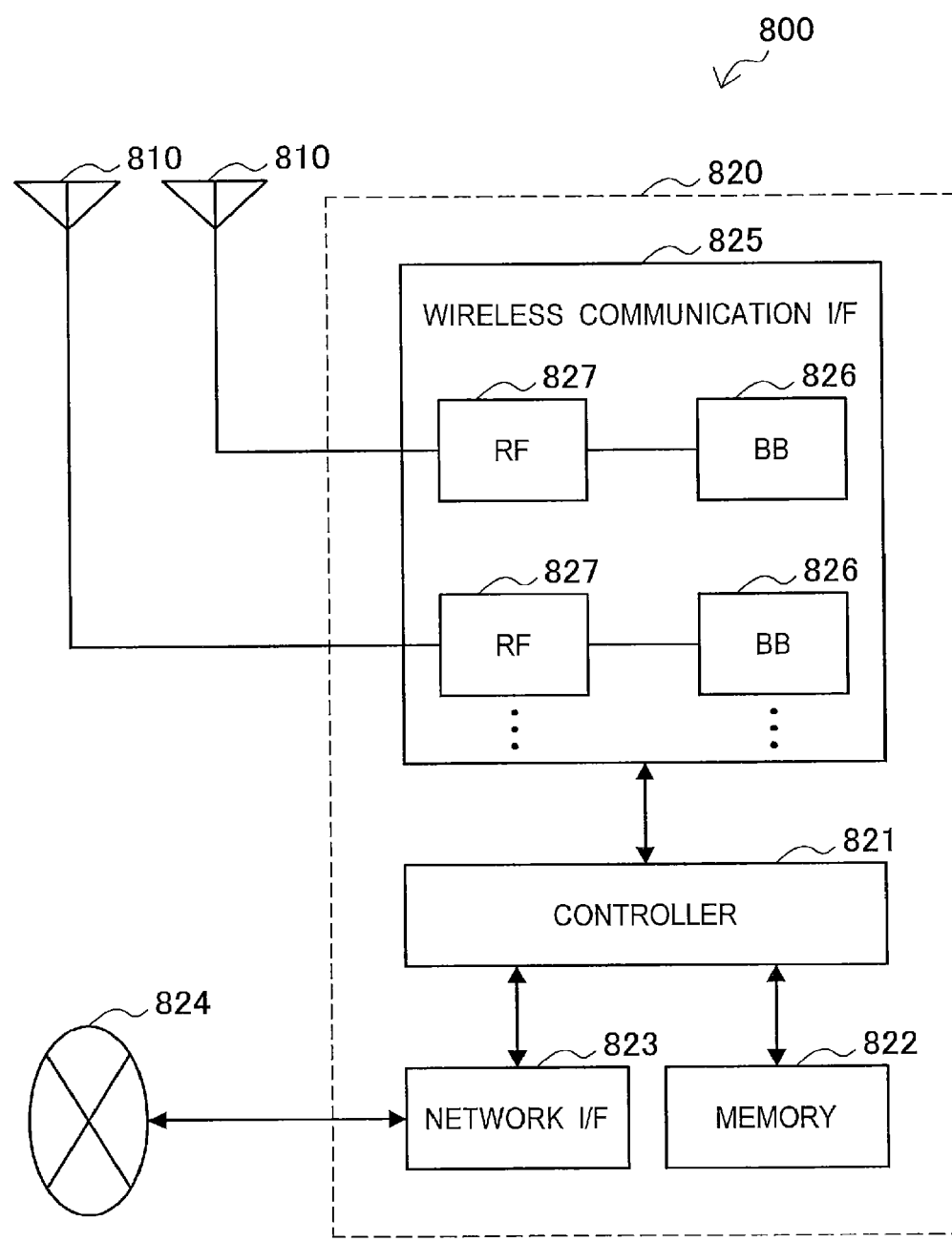
FIG. 15 is a block diagram illustrating a first example of a schematic configuration of an eNB.

FIG. 15 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g. a plurality of antenna elements constituting a MIMO antenna) and is used for the base station apparatus 820 to transmit and receive a wireless signal. The eNB 800 may include the plurality of the antennas 810 as illustrated in FIG. 15, and the plurality of antennas 810 may, for example, correspond to a plurality of frequency bands used by the eNB 800. It should be noted that while FIG. 15 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. The controller 821 may also have a logical function of performing control such as radio resource control, radio bearer control, mobility management, admission control, and scheduling. The control may be performed in cooperation with a surrounding eNB or a core network. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g. Si interface or X2 interface). The network interface 823 may be a wired communication interface or a wireless communication interface for wireless backhaul. When the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826 and an RF circuit 827. The BB processor 826 may, for example, perform encoding/decoding, modulation/demodulation, multiplexing/demultiplexing, and the like, and performs a variety of signal processing on each layer (e.g. L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. The module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 15, and the plurality of BB processors 826 may, for example, correspond to a plurality of frequency bands used by the eNB 800. The wireless communication interface 825 may also include a plurality of the RF circuits 827, as illustrated in FIG. 15, and the plurality of RF circuits 827 may, for example, correspond to a plurality of antenna elements. FIG. 15 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 15, the information acquisition unit 151 and the control unit 153 described above with reference to FIG. 8 may be mounted in the wireless communication interface 825. Alternatively, at least some of the components may be mounted in the controller 821. As an example, the eNB 800 may be equipped with a module including some or all components of the wireless communication interface 825 (for example, the BB processor 826) and/or the controller 821, and the information acquisition unit 151 and the control unit 153 may be mounted in the module. In this case, the module may store a program causing the processor to function as the information acquisition unit 151 and the control unit 153 (that is, a program causing the processor to perform the operation of the information acquisition unit 151 and the control unit 153) and execute the program. As another example, the program causing the processor to function as the information acquisition unit 151 and the control unit 153 may be installed in the eNB 800, and the wireless communication interface 825 (for example, the BB processor 826) and/or the controller 821 may execute the program. As described above, the eNB 800, the base station apparatus 820, or the module may be provided as an apparatus including the information acquisition unit 151 and the control unit 153, and the program causing the processor to function as the information acquisition unit 151 and the control unit 153 may be provided. A readable recording medium in which the program is recorded may be provided.

In addition, in the eNB 800 shown in FIG. 15, the wireless communication unit 120 described with reference to FIG. 8 may be implemented by the wireless communication interface 825 (for example, the RF circuit 827). Moreover, the antenna unit 110 may be implemented by the antenna 810. In addition, the network communication unit 130 may be implemented by the controller 821 and/or the network interface 823.

Second Application Example

Figure 16:
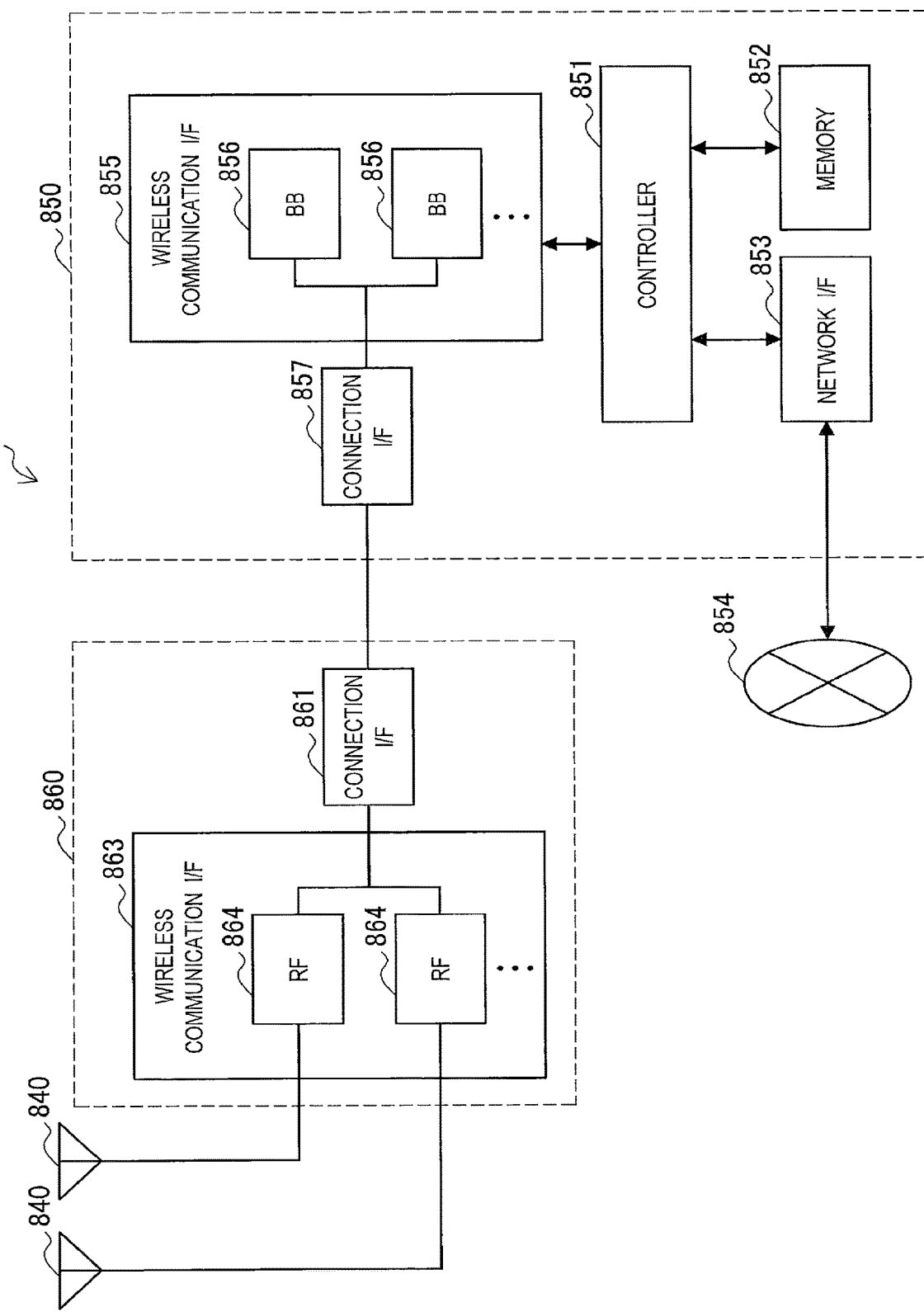
FIG. 16 is a block diagram illustrating a second example of the schematic configuration of the eNB.

FIG. 16 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. The base station apparatus 850 and the RRH 860 may be connected to each other by a high speed line such as optical fiber cables.

Each of the antennas 840 includes a single or a plurality of antenna elements (e.g. antenna elements constituting a MIMO antenna), and is used for the RRH 860 to transmit and receive a wireless signal. The eNB 830 may include a plurality of the antennas 840 as illustrated in FIG. 16, and the plurality of antennas 840 may, for example, correspond to a plurality of frequency bands used by the eNB 830. FIG. 16 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 15.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856. The BB processor 856 is the same as the BB processor 826 described with reference to FIG. 15 except that the BB processor 856 is connected to an RF circuit 864 of the RRH 860 via the connection interface 857. The wireless communication interface 855 may include a plurality of the BB processors 856, as illustrated in FIG. 16, and the plurality of BB processors 856 may, for example, correspond to a plurality of frequency bands used by the eNB 830 respectively. FIG. 16 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864. The RF circuit 864 may include a mixer, a filter, an amplifier and the like, and transmits and receives a wireless signal via the antenna 840. The wireless communication interface 863 may include a plurality of the RF circuits 864 as illustrated in FIG. 16, and the plurality of RF circuits 864 may, for example, correspond to a plurality of antenna elements. FIG. 16 illustrates an example in which the wireless communication interface 863 includes the plurality of RF circuits 864, but the wireless communication interface 863 may include the single RF circuit 864.

In the eNB 830 illustrated in FIG. 16, the information acquisition unit 151 and the control unit 153 described above with reference to FIG. 8 may be mounted in the wireless communication interface 855 and the wireless communication interface 863. Alternatively, at least some of the components may be mounted in the controller 851. As an example, the eNB 830 may be equipped with a module including some or all components of the wireless communication interface 855 (for example, the BB processor 856) and/or the controller 851, and the information acquisition unit 151 and the control unit 153 may be mounted in the module. In this case, the module may store a program causing the processor to function as the information acquisition unit 151 and the control unit 153 (that is, a program causing the processor to perform the operation of the information acquisition unit 151 and the control unit 153) and execute the program. As another example, the program causing the processor to function as the information acquisition unit 151 and the control unit 153 may be installed in the eNB 830, and the wireless communication interface 855 (for example, the BB processor 856) and/or the controller 851 may execute the program. As described above, the eNB 830, the base station apparatus 850, or the module may be provided as an apparatus including the information acquisition unit 151 and the control unit 153, and the program causing the processor to function as the information acqui-sition unit 151 and the control unit 153 may be provided. A readable recording medium in which the program is recorded may be provided.

In addition, in the eNB 830 shown in FIG. 16, the wireless communication unit 120 described with reference to FIG. 8 may be implemented by the wireless communication interface 863 (for example, the RF circuit 864). Moreover, the antenna unit 110 may be implemented by the antenna 840. In addition, the network communication unit 130 may be implemented by the controller 851 and/or the network interface 853.

<6.2. Application Examples for Terminal Apparatus>

First Application Example

FIG. 17 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and a secondary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, and an acceleration sensor. The microphone 908 converts a sound that is input into the smartphone 900 to an audio signal. The input device 909 includes, for example, a touch sensor which detects that a screen of the display device 910 is touched, a key pad, a keyboard, a button, or a switch, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 17. FIG. 17 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 17. FIG. 17 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the secondary controller 919 to each other. The battery 918 supplies electric power to each block of the smartphone 900 illustrated in FIG. 17 via a feeder line that is partially illustrated in the figure as a dashed line. The secondary controller 919, for example, operates a minimally necessary function of the smartphone 900 in a sleep mode.

In the smartphone 900 illustrated in FIG. 17, the information acquisition unit 241 and the control unit 243 described above with reference to FIG. 9 may be mounted in the wireless communication interface 912. Alternatively, at least some of the components may be mounted in the processor 901 or the secondary controller 919. As an example, the smartphone 900 may be equipped with a module including some or all components of the wireless communication interface 912 (for example, the BB processor 913), the processor 901, and/or the secondary controller 919, and the information acquisition unit 241 and the control unit 243 may be mounted in the module. In this case, the module may store a program causing the processor to function as the information acquisition unit 241 and the control unit 243 (that is, a program causing the processor to perform the operation of the information acquisition unit 241 and the control unit 243) and execute the program. As another example, the program causing the processor to function as the information acquisition unit 241 and the control unit 243 may be installed in the smartphone 900, and the wireless communication interface 912 (for example, the BB processor 913), the processor 901, and/or the secondary controller 919 may execute the program. As described above, the smartphone 900 or the module may be provided as an apparatus including the information acquisition unit 241 and the control unit 243, and the program causing the processor to function as the information acquisition unit 241 and the control unit 243 may be provided. A readable recording medium in which the program is recorded may be provided.

In addition, in the smartphone 900 shown in FIG. 17, the wireless communication unit 220 described with reference to FIG. 9 may be implemented by the wireless communication interface 912 (for example, the RF circuit 914). Moreover, the antenna unit 210 may be implemented by the antenna 916.

Second Application Example

FIG. 18 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g. latitude, longitude, and altitude) of the car navigation apparatus 920. The sensor 925 may include a sensor group including, for example, a gyro sensor, a geomagnetic sensor, and a barometric sensor. The data interface 926 is, for example, connected to an in-vehicle network 941 via a terminal that is not illustrated, and acquires data such as vehicle speed data generated on the vehicle side.

The content player 927 reproduces content stored in a storage medium (e.g. CD or DVD) inserted into the storage medium interface 928. The input device 929 includes, for example, a touch sensor which detects that a screen of the display device 930 is touched, a button, or a switch, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 18. FIG. 18 illustrates an example in which the wireless communication interface 933 includes a plurality of BB processors 934 and a plurality of RF circuits 935, but the wireless communication interface 933 may be a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 includes a plurality of antennas 937 as illustrated in FIG. 18. FIG. 18 illustrates an example in which the car navigation apparatus 920 includes a plurality of antennas 937, but the car navigation apparatus 920 may include a single antenna 937.

Further, the smartphone 920 may include the antenna 937 for each wireless communication system. In this case, the antenna switch 936 may be omitted from a configuration of the car navigation apparatus 920.

The battery 950 supplies electric power to each block of the car navigation apparatus 930 illustrated in FIG. 18 via a feeder line that is partially illustrated in the figure as a dashed line. The battery 950 accumulates the electric power supplied from the vehicle.

In the car navigation apparatus 920 illustrated in FIG. 18, the information acquisition unit 241 and the control unit 243 described above with reference to FIG. 9 may be mounted in the wireless communication interface 933. Alternatively, at least some of the components may be mounted in the processor 921. As an example, the car navigation apparatus 920 may be equipped with a module including some or all components of the wireless communication interface 933 (for example, the BB processor 934), and the information acquisition unit 241 and the control unit 243 may be mounted in the module. In this case, the module may store a program causing the processor to function as the information acquisition unit 241 and the control unit 243 (that is, a program causing the processor to perform the operation of the information acquisition unit 241 and the control unit 243) and execute the program. As another example, the program causing the processor to function as the information acquisition unit 241 and the control unit 243 may be installed in the car navigation apparatus 920, and the wireless communication interface 933 (for example, the BB processor 934) and/or the processor 921 may execute the program. As described above, the car navigation apparatus 920 or the module may be provided as an apparatus including the information acquisition unit 241 and the control unit 243, and the program causing the processor to function as the information acquisition unit 241 and the control unit 243 may be provided. A readable recording medium in which the program is recorded may be provided.

In addition, in the car navigation apparatus 920 shown in FIG. 18, the wireless communication unit 220 described with reference to FIG. 9 may be implemented by the wireless communication interface 933 (for example, the RF circuit 935). Moreover, the antenna unit 210 may be implemented by the antenna 937.

The technology of the present disclosure may also be realized as an in-vehicle system (or a vehicle) 940 including one or more blocks of the car navigation apparatus 920, the in-vehicle network 941, and a vehicle module 942. In other words, the in-vehicle system (or a vehicle) 940 may be provided as a device which includes the information acquisition unit 241 and the control unit 243. The vehicle side module 942 generates vehicle data such as vehicle speed, engine speed, and trouble information, and outputs the generated data to the in-vehicle network 941.

7. Conclusion

So far, each of devices and processes according to embodiments of the present disclosure have been described with reference to FIGS. 5 to 18.

(1) First Embodiment

According to the first embodiment, the base station 100 includes the information acquisition unit 151 that acquires a weight set for forming a directional beam and the control unit 153 that multiplies a reference signal for channel quality measurement by the weight set. The weight set is a weight set which may be generated from the first weight set for acquiring directivity in the first direction, the second weight set for acquiring directivity in the second direction and the third weight set for phase adjustment of dual layer MIMO. The third weight set is a specific one of a plurality of weight sets for phase adjustment of dual layer MIMO.

In addition, according to the first embodiment, the terminal apparatus 200 includes the information acquisition unit 241 that acquires information indicating the configuration of a reference signal for channel quality measurement multiplied by a weight set for forming a directional beam, and the control unit 243 that calculates the amount of interference of the directional beam from the reference signal multiplied by the weight set. The weight set is a weight set which may be generated from the first weight set for acquiring directivity in the first direction, the second weight set for acquiring directivity in the second direction and the third weight set for phase adjustment of dual layer MIMO. The third weight set is a specific one of a plurality of weight sets for phase adjustment of dual layer MIMO.

Accordingly, it is possible to more appropriately recognize an interference situation of a directional beam, for example.

(2) Second Embodiment

According to the second embodiment, the base station 100 includes the information acquisition unit 151 that acquires measurement restriction information indicating restriction on measurement of a reference signal for channel quality measurement transmitted over a directional beam, and a control unit 153 that notifies the terminal apparatus 200 of the measurement restriction information.

In addition, according to the second embodiment, the terminal apparatus 200 includes the information acquisition unit 241 that acquires measurement restriction information indicating restriction on measurement of a reference signal for channel quality measurement transmitted over a directional beam, and a control unit 243 that performs measurement of a reference signal for channel quality measurement transmitted over a directional beam on the basis of the measurement restriction information.

Accordingly, it is possible to restrict a measurement load in the terminal apparatus 200, for example.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although an example is described in which the system is a system that is compliant with LTE, LTE-Advanced, or a communication scheme that conforms to them, the present disclosure is not limited to such an example. For example, the communication system may be a system that conforms to another communication standard.

Further, it is not always necessary to execute the processing steps in the processing in the present specification in chronological order in order described in the flowcharts or the sequence diagrams. For example, the processing steps in the above-described processing may be executed in order different from the order described in the flowcharts or the sequence diagrams or may be executed in parallel.

In addition, a computer program for causing a processor (for example, a CPU, a DSP, or the like) provided in a device of the present specification (for example, a base station, a base station apparatus or a module for a base station apparatus, or a terminal apparatus or a module for a terminal apparatus) to function as a constituent element of the device (for example, the information acquisition unit, the control unit, or the like) (in other words, a computer program for causing the processor to execute operations of the constituent element of the device) can also be created. In addition, a recording medium in which the computer program is recorded may also be provided. Further, a device that includes a memory in which the computer program is stored and one or more processors that can execute the computer program (a base station, a base station apparatus or a module for a base station apparatus, or a terminal apparatus or a module for a terminal apparatus) may also be provided. In addition, a method including an operation of the constituent element of the device (for example, the information acquisition unit, the communication control unit, or the like) is also included in the technology of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)
An apparatus including:
an acquisition unit that acquires a weight set for forming a directional beam; and
a control unit that multiplies a reference signal for channel quality measurement by the weight set,
in which the weight set is a weight set that is able to be generated from a first weight set for acquiring directivity in a first direction, a second weight set for acquiring directivity in a second direction, and a third weight set for phase adjustment of dual layer multiple-input multiple-output (MIMO), and
the third weight set is a specific one of a plurality of weight sets for phase adjustment of dual layer MIMO.

(2)
The apparatus according to (1),
in which the first direction and the second direction are orthogonal to each other.

(3)
The apparatus according to (2),
in which the first direction is a horizontal direction, and the second direction is a vertical direction.

(4)
The apparatus according to any one of (1) to (3),
in which the reference signal is a channel state information reference signal (CSI-RS).

(5)
The apparatus according to any one of (1) to (4),
in which the control unit notifies a terminal apparatus of a configuration of the reference signal.

(6)
The apparatus according to any one of (1) to (5),
in which the control unit notifies a neighbor base station of the configuration of the reference signal.

(7)
The apparatus according to (5) or (6),
in which the configuration includes at least one of a radio resource used to transmit the reference signal and a sequence of the reference signal.

(8)
The apparatus according to any one of (1) to (7),
in which the acquisition unit acquires two or more weight sets for forming two or more directional beams,
the control unit respectively multiplies two or more reference signals for channel quality measurement by the two or more weight sets,
each of the two or more weight sets is a weight set that is able to be generated from the first weight set for acquiring directivity in the first direction, the second weight set for acquiring directivity in the second direction, and the third weight set for phase adjustment of dual layer MIMO, and
the third weight set is the specific one of the plurality of weight sets.

(9)
The apparatus according to (8),
in which the two or more reference signals have different configurations from each other.

(10)
A method including, by a processor:
acquiring a weight set for forming a directional beam; and
multiplying a reference signal for channel quality measurement by the weight set,
in which the weight set is a weight set that is able to be generated from a first weight set for acquiring directivity in a first direction, a second weight set for acquiring directivity in a second direction, and a third weight set for phase adjustment of dual layer MIMO, and
the third weight set is a specific one of a plurality of weight sets for phase adjustment of dual layer MIMO.

(11)
An apparatus including:
an acquisition unit that acquires information indicating a configuration of a reference signal for channel quality measurement to be multiplied by a weight set for forming a directional beam; and
a control unit that calculates an amount of interference of the directional beam from the reference signal multiplied by the weight set,
in which the weight set is a weight set that is able to be generated from a first weight set for acquiring directivity in a first direction, a second weight set for acquiring directivity in a second direction, and a third weight set for phase adjustment of dual layer MIMO, and the third weight set is a specific one of a plurality of weight sets for phase adjustment of dual layer MIMO.

(12)

The apparatus according to (11), in which the control unit estimates a channel from the reference signal and calculates the amount of interference on the basis of the channel and the plurality of weight sets.

(13)

The apparatus according to (11) or (12), in which the acquisition unit acquires information indicating a configuration of each of two or more reference signals for channel quality measurement that are respectively multiplied by two or more weight sets for forming two or more directional beams, the control unit calculates an amount of interference of each of the two or more directional beams from the two or more reference signals that are respectively multiplied by the two or more weight sets, each of the two or more weight sets is a weight set that is able to be generated from a first weight set for acquiring directivity in a first direction, a second weight set for acquiring directivity in a second direction, and a third weight set for phase adjustment of dual layer MIMO, and the third weight set is the specific one of the plurality of weight sets.

(14)

An apparatus including:

an acquisition unit that acquires measurement restriction information indicating restriction on measurement of a reference signal for channel quality measurement transmitted over a directional beam; and a control unit that notifies a terminal apparatus of the measurement restriction information.

(15)

The apparatus according to (14), in which the measurement restriction information includes information indicating the number of directional beams which are measurement targets.

(16)

The apparatus according to (14) or (15), in which the measurement restriction information includes information about a lower limit of power of a directional beam which is a measurement target.

(17)

The apparatus according to any one of (14) to (16), in which the measurement restriction information includes information indicating priorities of base stations or directional beams which are measurement targets.

(18)

The apparatus according to any one of (14) to (17), in which the control unit notifies the terminal apparatus of the measurement restriction information in system information or through individual signaling to the terminal apparatus.

(19)

A method including, by a processor:

acquiring measurement restriction information indicating restriction on measurement of a reference signal for channel quality measurement transmitted over a directional beam; and notifying a terminal apparatus of the measurement restriction information.

(20)

An apparatus including:

an acquiring unit that acquires measurement restriction information indicating restriction on measurement of a reference signal for channel quality measurement transmitted over a directional beam; and a control unit that performs measurement of a reference signal for channel quality measurement transmitted over a directional beam on the basis of the measurement restriction information.

(21)

A program causing a processor to execute:

acquiring a weight set for forming a directional beam; and multiplying a reference signal for channel quality measurement by the weight set, in which the weight set is a weight set that is able to be generated from a first weight set for acquiring directivity in a first direction, a second weight set for acquiring directivity in a second direction, and a third weight set for phase adjustment of dual layer multiple-input multiple-output (MIMO), and the third weight set is a specific one of a plurality of weight sets for phase adjustment of dual layer MIMO.

(22)

A recording medium having a program stored therein, the program causing a processor to execute:

acquiring a weight set for forming a directional beam; and multiplying a reference signal for channel quality measurement by the weight set, in which the weight set is a weight set that is able to be generated from a first weight set for acquiring directivity in a first direction, a second weight set for acquiring directivity in a second direction, and a third weight set for phase adjustment of dual layer multiple-input multiple-output (MIMO), and the third weight set is a specific one of a plurality of weight sets for phase adjustment of dual layer MIMO.

(23)

An method including, by a processor:

acquiring information indicating a configuration of a reference signal for channel quality measurement to be multiplied by a weight set for forming a directional beam; and calculating an amount of interference of the directional beam from the reference signal multiplied by the weight set, in which the weight set is a weight set that is able to be generated from a first weight set for acquiring directivity in a first direction, a second weight set for acquiring directivity in a second direction, and a third weight set for phase adjustment of dual layer MIMO, and the third weight set is a specific one of a plurality of weight sets for phase adjustment of dual layer MIMO.

(24)

A program causing a processor to execute:

acquiring information indicating a configuration of a reference signal for channel quality measurement to be multiplied by a weight set for forming a directional beam; and calculating an amount of interference of the directional beam from the reference signal multiplied by the weight set, in which the weight set is a weight set that is able to be generated from a first weight set for acquiring directivity in a first direction, a second weight set for acquiring directivity in a second direction, and a third weight set for phase adjustment of dual layer MIMO, and the third weight set is a specific one of a plurality of weight sets for phase adjustment of dual layer MIMO.

(25)

A recording medium having a program stored therein, the program causing a processor to execute:

acquiring information indicating a configuration of a reference signal for channel quality measurement to be multiplied by a weight set for forming a directional beam; and calculating an amount of interference of the directional beam from the reference signal multiplied by the weight set, in which the weight set is a weight set that is able to be generated from a first weight set for acquiring directivity in a first direction, a second weight set for acquiring directivity in a second direction, and a third weight set for phase adjustment of dual layer MIMO, and the third weight set is a specific one of a plurality of weight sets for phase adjustment of dual layer MIMO.

(26)

A program causing a processor to execute:

acquiring measurement restriction information indicating restriction on measurement of a reference signal for channel quality measurement transmitted over a directional beam; and notifying a terminal apparatus of the measurement restriction information.

(27)

A readable recording medium having a program stored therein, the program causing a processor to execute:

acquiring measurement restriction information indicating restriction on measurement of a reference signal for channel quality measurement transmitted over a directional beam; and notifying a terminal apparatus of the measurement restriction information.

(28)

A method including, by a processor:

acquiring measurement restriction information indicating restriction on measurement of a reference signal for channel quality measurement transmitted over a directional beam; and performing measurement of a reference signal for channel quality measurement transmitted over a directional beam on the basis of the measurement restriction information.

(29)

A program causing a processor to execute:

acquiring measurement restriction information indicating restriction on measurement of a reference signal for channel quality measurement transmitted over a directional beam; and performing measurement of a reference signal for channel quality measurement transmitted over a directional beam on the basis of the measurement restriction information.

(30)

A readable recording medium having a program stored therein, the program causing a processor to execute:

acquiring measurement restriction information indicating restriction on measurement of a reference signal for channel quality measurement transmitted over a directional beam; and performing measurement of a reference signal for channel quality measurement transmitted over a directional beam on the basis of the measurement restriction information.

REFERENCE SIGNS LIST 1 system
100 base station
101 cell
151 information acquisition unit
153 control unit
200 terminal apparatus
241 information acquisition unit
243 control unit

The invention claimed is:

1. An apparatus, comprising:
circuitry configured to
transmit, to a terminal device, measurement restriction information indicating a measurement restriction of transmission of a channel state information reference signal (CSI-RS), the measurement restriction information including information about a lower limit of received power of a directional beam which is a measurement target, and wherein the information about the lower limit of the received power is information indicating an offset between power of a desired directional beam and the lower limit; and
transmit, to the terminal device, configuration information of a non-zero-power (NZP) CSI-RS and a zero-power (ZP) CSI-RS, wherein
the configuration information includes at least one of radio resources used to transmit the NZP CSI-RS and ZP CSI-RS and a sequence of the NZP CSI-RS and ZP CSI-RS.

2. The apparatus according to claim 1, wherein the measurement restriction information includes information indicating a number of directional beams which are measurement targets.

3. The apparatus according to claim 1, wherein the measurement restriction information includes information indicating priorities of base stations or directional beams which are measurement targets.

4. The apparatus according to claim 1, wherein the circuitry is configured to notify the terminal apparatus of the measurement restriction information in system information or through individual signaling to the terminal apparatus.

5. The apparatus according to claim 1, wherein the configuration information includes at least one of a radio resource used to transmit the CSI-RS and a sequence of the CSI-RS.

6. The apparatus according to claim 1, wherein the circuitry is configured to notify a terminal apparatus or a surrounding base station of the measurement restriction information.

7. The apparatus of claim 1, wherein the NZP CSI-RS is transmitted by a non-directional beam.

8. The apparatus of claim 1, wherein the ZP CSI-RS is transmitted by a directional beam.

9. The apparatus of claim 1, wherein the circuitry is configured to:
acquire two or more weight sets for forming two or more directional beams; and
respectively multiply two or more CSI-RSs by the two or more weight sets, wherein
a first weight set of the two or more weights sets is to acquire directivity in a first direction, and a second weight set of the two or more weight sets is to acquire directivity in a second direction.

10. The apparatus of claim 1, wherein the circuitry is further configured to notify measurement restriction information indicting respective measurement restrictions for a plurality of CSI-RSs transmitted by a plurality of directional beams.

11. The apparatus of claim 1, wherein the measurement restriction information includes information indicating priorities of base stations or directional beams that are measurement targets.

12. The apparatus of claim 1, wherein the apparatus is a base station in a wireless telecommunications network.

13. A method performed by a base station in a wireless communications system, the method comprising:
- transmitting, by circuitry of the base station to a terminal device, measurement restriction information indicating a measurement restriction of transmission of a channel state information reference signal (CSI-RS), the measurement restriction information including information about a lower limit of received power of a directional beam which is a measurement target, and wherein the information about the lower limit of the received power is information indicating an offset between power of a desired directional beam and the lower limit; and
- transmitting, by the base station to the terminal device, configuration information of a non-zero-power (NZP) CSI-RS and a zero-power (ZP) CSI-RS, wherein
- the configuration information includes at least one of radio resources used to transmit the NZP CSI-RS and ZP CSI-RS and a sequence of the NZP CSI-RS and ZP CSI-RS.

14. The method according to claim 13, wherein
the configuration information includes at least one of a radio resource used to transmit the CSI-RS and a sequence of the CSI-RS.

15. The method of claim 13, wherein
the NZP CSI-RS is transmitted by a non-directional beam, and
the ZP CSI-RS is transmitted by a directional beam.

* * * * *